US009357452B2

(12) United States Patent  
Johansson et al.

(10) Patent No.: US 9,357,452 B2  
(45) Date of Patent: May 31, 2016

(54) FULL MULTI OPERATOR CORE NETWORK (MOCN) AND MOBILITY TO OTHER RADIO ACCESS TECHNOLOGIES (RATS)

(71) Applicant: TELEFONAKTIEBOLAGET L M ERICSSON (PUBL), Stockholm (SE)

(72) Inventors: Nicklas Johansson, Brokind (SE); John Diachina, Garner, NC (US); Paul Schliwa-Bertling, Ljungsbro (SE); Claes-Goran Persson, Mjolby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 13/964,714

(22) Filed: Aug. 12, 2013

(65) Prior Publication Data

US 2014/0045499 A1 Feb. 13, 2014

Related U.S. Application Data

(60) Provisional application No. 61/682,520, filed on Aug. 13, 2012.

(51) Int. Cl.
 *H04W 36/00* (2009.01)
 *H04W 48/12* (2009.01)
 *H04W 48/18* (2009.01)

(52) U.S. Cl.
 CPC .......... *H04W 36/0083* (2013.01); *H04W 48/12* (2013.01); *H04W 48/18* (2013.01)

(58) Field of Classification Search
 CPC .. H04W 36/0083; H04W 36/00; H04W 48/18
 See application file for complete search history.

(56) References Cited

U.S. PATENT DOCUMENTS

| 6,400,942 | B1* | 6/2002 | Hansson et al. ............ 455/426.1 |
| 8,514,778 | B1* | 8/2013 | Fang et al. .................... 370/328 |
| 2008/0188215 | A1* | 8/2008 | Bergstrom et al. ........... 455/424 |
| 2009/0325577 | A1 | 12/2009 | Furtenback et al. |
| 2010/0279691 | A1* | 11/2010 | Dwyer et al. ................. 455/436 |

(Continued)

OTHER PUBLICATIONS

3$^{rd}$ Generation Partnership Project; Technical Specification Group GSM/EDGE Radio Access Network; Mobile radio interface layer 3 specification; Radio Resource Control (RCC) protocol (Release 11). 3GPP TS 44.018 v11.1.0 (May 2012).

(Continued)

*Primary Examiner* — Jinsong Hu  
*Assistant Examiner* — Tabla Glomah

(57) ABSTRACT

A telecommunications node (e.g., base station subsystem) and method are described herein that broadcasts a set of system information messages (e.g., SI2quater messages or pairs of SI2ter messages and SI2quater messages) for use by a legacy mobile station which enhances the overall probability (over time) that the legacy mobile station (non-supporting mobile station) in a network sharing scenario will find frequency, cell information or a combination of both within the broadcasted system information messages to be used for the legacy mobile station's cell reselection process to provide continuity with the legacy mobile station's registered PLMN (i.e. the Common PLMN of a shared radio access network). In addition, the telecommunications node (e.g., base station subsystem) and method can also broadcast a different type of system information message for used by a supporting mobile station.

20 Claims, 6 Drawing Sheets

(56) References Cited

U.S. PATENT DOCUMENTS

2011/0261891 A1* 10/2011 Vos et al. .................. 375/259
2014/0045499 A1* 2/2014 Johansson et al. ............ 455/436
2014/0204907 A1* 7/2014 Wang et al. ................. 370/331

OTHER PUBLICATIONS

3$^{rd}$ Generation Partnership Project; Technical Specification Group Services and System Aspects; Network Sharing; Architecture and functional description (Release 11). 3GPP TS 23.251 v11.2.0 (Jun. 2012).

3$^{rd}$ Generation Partnership Project; Technical Specification Group Core Network and Terminals; Mobile radio interface Layer 3 specification; Core network protocols; Stage 3 (Release 11). 3GPP TS 24.008 v11.3.0 (Jun. 2012).

Alcatel-Lucent, et al: "Broadcast of PLMN-related information for Network Sharing". 3GPP TSG GERAN WG1 Meeting #54. GP-120763. Mar. 15-17, 2012. Sanya, China.

3$^{rd}$ Generation Partnership Project; Technical Specification Group GSM/EDGE Radio Access Network; Radio subsystem link control (Release 11). 3GPP TS 45.008 v11.1.0 (May 2012).

Telefon AB LM Ericsson et al: "Full MOCN and mobility to other RATs", 3GPP Draft; GP-120610 Full Mocn Mobility to Other Rats, 3rd Generation Partnership Project (3GPP), Mobile Competence Centre ; 650, Route Des Lucioles ; F-06921 Sophiaantipolis Ce Dex; France, TSG GERAN, Sanya, China; May 9, 2012.

Alcatel-Lucent: "Broadcast of PLNM-related information for Network Sharing", 3GPP Draft; GP-111724 Full-MOCN-GERAN CR 44018, 3rd Generation Partnership Project (3GPP), Mobile Competence Centre; 650, Route Des Lucioles; F-06921 Sophia-Antipolis Cedex; France, vol. GERAN WG2, No. Bratislava, Slovakia; 20111122-20111124, Nov. 16, 2011, XP050560939, [retrieved on Nov. 16, 2011] the whole document.

* cited by examiner

US 9,357,452 B2

FULL MULTI OPERATOR CORE NETWORK (MOCN) AND MOBILITY TO OTHER RADIO ACCESS TECHNOLOGIES (RATS)

CLAIM OF PRIORITY

This application claims the benefit U.S. Provisional Application Ser. No. 61/682,520 filed on Aug. 13, 2012. The contents of this document are incorporated by reference herein.

TECHNICAL FIELD

The present invention relates to a telecommunications node (e.g., BSS) and a method that broadcasts a set of system information messages (e.g., SI2quater messages or pairs of SI2ter messages and SI2quater messages) used by a legacy mobile station which enhances the overall probability (over time) that the legacy mobile station (non-supporting mobile station) in a network sharing scenario will find frequency information, cell information or a combination of both within the broadcasted system information messages which can be used for the legacy mobile station's cell reselection process to provide continuity with the legacy mobile station's registered radio network (i.e., the common PLMN of GERAN network). In addition, the telecommunications node (e.g., BSS) and method can also broadcast a different type of system information message used by a supporting mobile station.

BACKGROUND

The following abbreviations and definitions are herewith defined, where at least some of the abbreviations are referred to within the following description of the prior art and the present invention.
3GPP Third Generation Partnership Project
BCCH Broadcast Control Channel
BSS Base Station Subsystem
E-UTRA Evolved Universal Terrestrial Radio Access
E-UTRAN Evolved Universal Terrestrial Radio Access Network
FDD Frequency Division Duplex
GERAN GSM EDGE Radio Access Network
GSM Global System for Mobile communications
PLMN Public Land Mobile Network
MOCN Multi Operator Core Network
MS Mobile Station
RAT Radio Access Technology
TDD Time Division Duplex
UE User Equipment
UTRA UMTS Terrestrial Radio Access
UTRAN UMTS Terrestrial Radio Access Network Legacy mobile station (e.g., non-supporting UE): A mobile station that does not support network sharing in the sense that it ignores broadcast system information that is specific for network sharing for 3GPP (E)-UTRAN and GERAN and is limited to becoming registered with the common PLMN indicated by the serving network. The term "network sharing non-supporting UE" may also be used to describe the legacy mobile station (non-supporting UE).

Supporting mobile station (e.g., supporting UE): A mobile station that supports network sharing in the sense that it is able to select a core network operator as the serving operator within a shared network and is therefore not limited to becoming registered with the common PLMN indicated by the serving network. The term "network sharing supporting UE" may also be used to describe the supporting mobile station (supporting UE).

PLMN: A Public Land Mobile Network is a network that is established and operated by an administration or by a recognized operating agency for the specific purpose of providing land mobile telecommunications services to the public. The PLMN is identified by the Mobile Country Code (MCC) and the Mobile Network Code (MNC). Each operator providing mobile services has their own PLMN. PLMNs interconnect with other PLMNs and Public Switched Telephone Networks (PSTN) for telephone communications or with Internet service providers for data and internet access of which links are defined as interconnect links between providers.

PLMN'S RATs: The Radio Access Technologies (RATs) that a given PLMN provides as a part of the service to the public, e.g., GSM, UTRA or E-UTRA.

SI12quater's cells-frequencies: UTRAN's cell and frequency information and/or E-UTRAN's frequencies can be provided in the SI2quater messages that a mobile station uses for idle mode cell (re)selection SI2ter's frequencies: UTRAN frequencies in the SI2ter messages that a mobile station uses for idle mode cell (re) selection.

Common PLMN: when network sharing is in use within a given cell, the Common PLMN refers to the PLMN of the GERAN network 100 which is identified by the PLMN ID broadcast in the SYSTEM INFORMATION TYPE 3 and SYSTEM INFORMATION TYPE 4 messages (as part of the Location Area Identification). See sub-clauses 9.1.35, 9.1.3 in 3GPP TS 44.018 V11.1.0 (May 2012). Also, see 3GPP TS 23.251 V.11.2.0 (June 2012), and 3GPP TS 24.008 V11.3.0 (June 2012). The contents of these documents are incorporated by reference herein.

Equivalent PLMN: A legacy mobile station can become registered for a GERAN network when it determines that the common PLMN thereof is equivalent to a PLMN it is programmed to consider as a preferred PLMN. As such, different non-supporting mobile stations may become registered for the common PLMN of a given GERAN network (i.e. they all have the same registered PLMN when served by the same GERAN network) while having different preferred PLMNs wherein any non-supporting mobile station may not consider their particular preferred PLMN(s) as being equivalent to the preferred PLMN(s) of other non-supporting mobile stations served by the same GERAN network.

Network sharing for supporting mobile stations is a feature for which there is an ongoing work item within 3GPP Release 11 which allows operators to share deployments costs. FIG. 1 (PRIOR ART) is a basic diagram that illustrates one plausible network sharing scenario where multiple operators share a GERAN radio access network 100 while at the same time each operator has their own dedicated E-UTRAN/UTRAN radio access network $102_1$, $102_2$, $102_3$, $102_4$ and $102_5$ for which there is a corresponding unique PLMN value. Each dedicated E-UTRAN/UTRAN radio access network $102_1$, $102_2$, $102_3$, $102_4$ and $102_5$ is respectively referred to herein as PLMN $102_1$, $102_2$, $102_3$, $102_4$ and $102_5$ and each of these has one or more corresponding (e)NodeBs $103_{1a}$, $103_{1b}$, $103_{1c}$, $103_{2a}$, $103_{2b}$, $103_{2c}$, $103_{3a}$, $103_{3b}$, $103_{3c}$, $103_{4a}$, $103_{4b}$, $103_{4c}$, $103_{5a}$, $103_{5b}$, and $103_{5c}$. In this example, each PLMN $102_1$, $102_2$, $102_3$, $102_4$ and $102_5$ is shown as having three (e)NodeBs but they could have any number of (e)NodeBs. Further, each (e)NodeB $103_{1a}$, $103_{1b}$, $103_{1c}$, $103_{2a}$, $103_{2b}$, $103_{2c}$, $103_{3a}$, $103_{3b}$, $103_{3c}$, $103_{4a}$, $103_{4b}$, $103_{4c}$, and $103_{5a}$, $103_{5b}$, $103_{5c}$ is shown respectively supporting two cells $103_{1a1}$, $103_{1a2}$, $103_{1b1}$, $103_{1b2}$, $103_{1c1}$, $103_{1c2}$, $103_{2a1}$, $103_{2a2}$, $103_{2b1}$, $103_{2b2}$, $103_{2c1}$, $103_{2c2}$, $103_{3a1}$, $103_{3a2}$, $103_{3b1}$, $103_{3b2}$, $103_{3c1}$, $103_{3c2}$, $103_{4a1}$, $103_{4a2}$, $103_{4b1}$, $103_{4b2}$, $103_{4c1}$, $103_{4c2}$, $103_{5a1}$, $103_{5a2}$, $103_{5b1}$, $103_{5b2}$, $103_{5c1}$, and $103_{5c2}$. However, it should be appreciated that each (e)NodeB $103_{1a}$, $103_{1b}$, $103_{1c}$, $103_{2a}$, $103_{2b}$, $103_{2c}$, $103_{3a}$, $103_{3b}$, $103_{3c}$, $103_{4a}$, $103_{4b}$, $103_{4c}$, and $103_{5a}$, $103_{5b}$, $103_{5c}$ can support any number of cells and that they do not have to support the same number of cells.

Today, in the current GERAN network 100, the BSS 104 broadcasts UTRAN/E-UTRAN neighbor cell information and associated thresholds in system information messages 106a and 106b (e.g., SI2quater message 106a and SI2ter message 106b—where the SI2quater message 106a supports both UTRAN and E-UTRAN related information (e.g., UTRAN's cells-frequencies, E-UTRAN's frequencies, thresholds) and the SI2ter message 106b only supports UTRAN related information (e.g., UTRAN's frequencies, thresholds) for both supporting mobile stations $108_1$, $108_2$ and $108_3$ (only three shown) and legacy mobile stations $110_1$, $110_2$, $110_3$, $110_4$, and $110_5$ (only five shown). In particular, the BSS 104 broadcasts UTRAN/E-UTRAN neighbor cell information and associated thresholds in SI2quater message 106a. Or, the BSS 104 broadcasts UTRAN/E-UTRAN neighbor cell information and associated thresholds in pairs of SI2quater message 106a and SI2ter message 106b. The BSS 104 also broadcasts a SI3 message 113 which indicates the BSS 104's support for network sharing. In addition, the BSS 104 broadcasts specific network sharing information in the SI22 message 115.

The supporting mobile stations $108_1$, $108_2$ and $108_3$ will each select one of the broadcasted PLMNs $102_1$, $102_2$, $102_3$, $102_4$ or $102_5$ identified within the SI22 message(s) 115 when performing cell reselection from the GERAN network 100. Then, in order to ensure that the supporting mobile stations $108_1$, $108_2$ and $108_3$ each have PLMN specific mobility to other RATs it is necessary to provide the supporting mobile stations $108_1$, $108_2$ and $108_3$ with system information to identify frequencies, cells, or combination of both in other RATs which are associated with their respective preferred PLMNs where each supporting mobile station $108_1$, $108_2$ and $108_3$ is programmed with information that identifies one or more of PLMN $102_1$, $102_2$, $102_3$, $102_4$ or $102_5$ as a preferred PLMN. To accomplish this, the BSS 104 broadcasts the SI2quater message 106a and SI2ter message 106b to provide this system information (e.g., SI2quater message 106a includes cells-frequencies and SI2ter message 106b includes frequencies) for up to 5 PLMNs to the supporting mobile stations $108_1$, $108_2$ and $108_3$. However, the introduction of network sharing which includes the requirement of the BSS 104 broadcasting the SI2quater/SI2ter messages 106a and 106b has at least one shortcoming associated with the legacy mobile stations $110_1$, $110_2$, $110_3$, $110_4$, and $110_5$ that needs to be addressed.

A main shortcoming of the BSS 104 broadcasting SI2quater/SI2ter messages 106a and 106b is that the behavior of the legacy mobile stations $110_1$, $110_2$, $110_3$, $110_4$, and $110_5$ is unspecified after they receive the SI2quater/SI2ter messages 106a and 106b as will be discussed in detail after describing some of the basic standardized capabilities of the legacy mobile stations $110_1$, $110_2$, $110_3$, $110_4$, and $110_5$. First, when it comes to providing UTRAN information, the 3G Cell Reselection list held by the legacy mobile stations $110_1$, $110_2$, $110_3$, $110_4$, and $110_5$ has a limitation of 96 cells (frequency+ scrambling code) and eight frequencies on their own as specified in the aforementioned 3GPP TS 44.018. A similar limitation also applies to the E-UTRAN information were a limitation of eight frequencies is specified in the aforementioned 3GPP TS 44.018.

Moreover, the legacy mobile stations $110_1$, $110_2$, $110_3$, $110_4$, and $110_5$ have minimum monitoring capabilities which are specified in sub-clause 6.6.4 of 3GG TS 45.008 V11.1.0 (May 2012) (the contents of which are incorporated by reference herein). Per this standard, the legacy mobile station's $110_1$, $110_2$, $110_3$, $110_4$, and $110_5$ minimum capabilities include monitoring three frequencies from each of the RATs and mode (FDD or TDD) or a maximum of 64 UTRAN cells. In addition, it is also stated in 3GPP 44.018 that the legacy mobile station's $110_1$, $110_2$, $110_3$, $110_4$, and $110_5$ behavior is not specified if the number of frequencies-cells exceeds their monitoring capabilities. Hence, a worst case scenario interpretation based on the above is that some legacy mobile stations $110_1$, $110_2$, $110_3$, $110_4$, and $110_5$ may only read the first three frequencies provided within the SI2quater/SI2ter messages 106a and 106b per RAT and mode and all will assume that each of these frequencies supports a preferred PLMN and therefore potentially ignore the remaining information (frequencies) provided within the SI2quater/SI2ter messages 106a and 106b which may provide frequency information corresponding to their preferred PLMNs (actually in some implementations some legacy mobile stations $110_1$, $110_2$, $110_3$, $110_4$, and $110_5$ may malfunction completely). In other words, it is unclear how legacy mobile stations $110_1$, $110_2$, $110_3$, $110_4$, and $110_5$ will function when the number of cells-frequencies/frequencies in the SI2quater/SI2ter messages 106a and 106b is used to their full information bearing potential. This is especially worrisome when network sharing is supported since in this case most of the frequencies included in the SI2quater/SI2ter messages 106a and 106b may not be associated with a PLMN that any given legacy mobile station $110_1$, $110_2$, $110_3$, $110_4$, and $110_5$ considers to be a preferred PLMN. As a result, there is an obvious risk that the legacy mobile station $110_1$, $110_2$, $110_3$, $110_4$, and $110_5$ will start monitoring UTRAN/E-UTRAN cells which belong to a "wrong" PLMN $102_1$, $102_2$, $102_3$, $102_4$ or $102_5$. To illustrate this problem, the legacy mobile station $110_1$ which is registered with the common PLMN in the GERAN network 100 while having a preferred PLMN consisting of PLMN $102_1$ may unknowingly monitor UTRAN/E-UTRAN cells associated with one or more other PLMNs $102_2$, $102_3$, $102_4$ or $102_5$ to which it has no mobility (i.e. any attempt to acquire service on a PLMN that is not a preferred PLMN can result in the mobile station $110_1$ experiencing service denial). If the legacy mobile station $110_1$ starts monitoring UTRAN/E-UTRAN cells which belong to a "wrong" PLMN $102_1$, $102_2$, $102_3$, $102_4$ or $102_5$ and eventually determines that one of the monitored cells/frequencies is good enough from a signal strength perspective it may try to select a cell associated with PLMN $102_2$, $102_3$, $102_4$ or $102_5$ to which is has no access (i.e. no mobility) and eventually will fall back to the GERAN radio access network 100. In other words, any attempt to reselect to such a cell associated with PLMN $102_2$, $102_3$, $102_4$ or $102_5$ will result in the legacy mobile station $110_1$ eventually determining that the PLMN supported therein is not one of the legacy mobile station's preferred PLMNs (or an equivalent PLMN of the legacy mobile station's preferred PLMNs). Further, the legacy mobile station $110_1$ during this time may be unreachable for pages. Hence, there is a need to address these problems and other problems associated with the current network sharing scheme. This need and other needs have been satisfied by the present invention.

SUMMARY

A telecommunications node (e.g., BSS), a legacy mobile station, a supporting mobile station and methods are described in the independent claims of the present application. Advantageous embodiments of the telecommunications node (e.g., BSS), the legacy mobile station, the supporting mobile station and the methods have been described in the dependent claims of the present application.

In one aspect, the present invention provides a telecommunications node (e.g., BSS) for use in a shared radio access network associated with a plurality of dedicated radio access networks. The telecommunications node comprising a transmitter, a processor, and a memory that stores processor-executable instructions where the processor interfaces with the memory and executes the processor-executable instructions to enable a broadcast act. In the broadcast act, the transmitter sequentially broadcasts a set of a first system information messages (e.g., SI2quater messages or pairs of SI2quater and SI2ter messages), wherein each one of the first system information messages is differentiated by an order of neighbor cell information listed therein when compared to the other first system information messages, and wherein the neighbor cell information is associated with one or more of the dedicated radio access networks. An advantage of the telecommunications node sequentially broadcasting the set of first system information messages in this manner is that it enhances the overall probability (over time) that each legacy mobile station in a network sharing scenario will find frequency information, cell information or a combination of both within the broadcasted first system information messages which can be used for the legacy mobile station's cell reselection process to provide continuity with the legacy mobile station's registered radio network (i.e. the Common PLMN of the GERAN network).

In another aspect, the present invention provides a method in a telecommunications node (e.g., BSS) for managing network sharing in a shared radio access network associated with a plurality of dedicated radio access networks. The method comprises a broadcast step where the telecommunications node sequentially broadcasts a set of a first system information messages (e.g., SI2quater messages or pairs of SI2quater and SI2ter messages), wherein each one of the first system information messages is differentiated by an order of neighbor cell information listed therein when compared to the other first system information messages, and wherein the neighbor cell information is associated with one or more of the dedicated radio access networks. An advantage of the telecommunications node sequentially broadcasting the set of first system information messages in this manner is that it enhances the overall probability (over time) that each legacy mobile station in a network sharing scenario will find frequency information, cell information or a combination of both within the broadcasted first system information messages which can be used for the legacy mobile station's cell reselection process to provide continuity with the legacy mobile station's registered radio network (i.e. the Common PLMN of the GERAN network).

In yet another aspect, the present invention provides a mobile station for use in a shared radio access network associated with a plurality of dedicated radio access networks. The mobile station comprises a receiving unit, a monitoring unit, a processor, and a memory that stores processor-executable instructions where the processor interfaces with the memory and executes the processor-executable instructions to enable a receiving act, a reading act, and a monitoring act. In the receiving act, the receiving unit receives (1) a set of a first system information messages (SI2quater or SI2quater/SI2ter), wherein each one of the first system information messages is differentiated by an order of neighbor cell information listed therein when compared to the other first system information messages, and wherein the neighbor cell information is associated with one or more of the dedicated radio access networks, and (2) a second system information message containing neighbor cell information associated with one or more of the dedicated radio access networks. In the reading act, the processor reads the neighbor cell information from the received second system information message. In the monitoring act, the monitoring unit monitors network features within one or more of the dedicated radio access networks, wherein the network features are associated with the neighbor cell information read from the received second system information message. An advantage of the supporting mobile station is that it acts on the broadcasted second system information message to monitor network features rather than acting on the broadcasted set of first system information messages (e.g., SI2quater messages or pairs of SI2quater and SI2ter messages) to monitor network features.

In yet another aspect, the present invention provides a method implemented by a mobile station for use in a shared radio access network associated with a plurality of dedicated radio access networks. The method comprises a receiving step, a reading step, and a monitoring step. In the receiving step, the supporting mobile station receives (1) a set of a first system information messages (SI2quater or SI2quater/SI2ter), wherein each one of the first system information messages is differentiated by an order of neighbor cell information listed therein when compared to the other first system information messages, and wherein the neighbor cell information is associated with one or more of the dedicated radio access networks, and (2) a second system information message containing neighbor cell information associated with one or more of the dedicated radio access networks. In the reading step, the supporting mobile station reads the neighbor cell information from the received second system information message. In the monitoring act, the supporting mobile station monitors network features within one or more of the dedicated radio access networks, wherein the network features are associated with the neighbor cell information read from the received second system information message. An advantage of the supporting mobile station implementing this method is that it acts on the broadcasted second system information message to monitor network features rather than acting on the broadcasted set of first system information messages (e.g., SI2quater messages or pairs of SI2quater and SI2ter messages) to monitor network features.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 2:
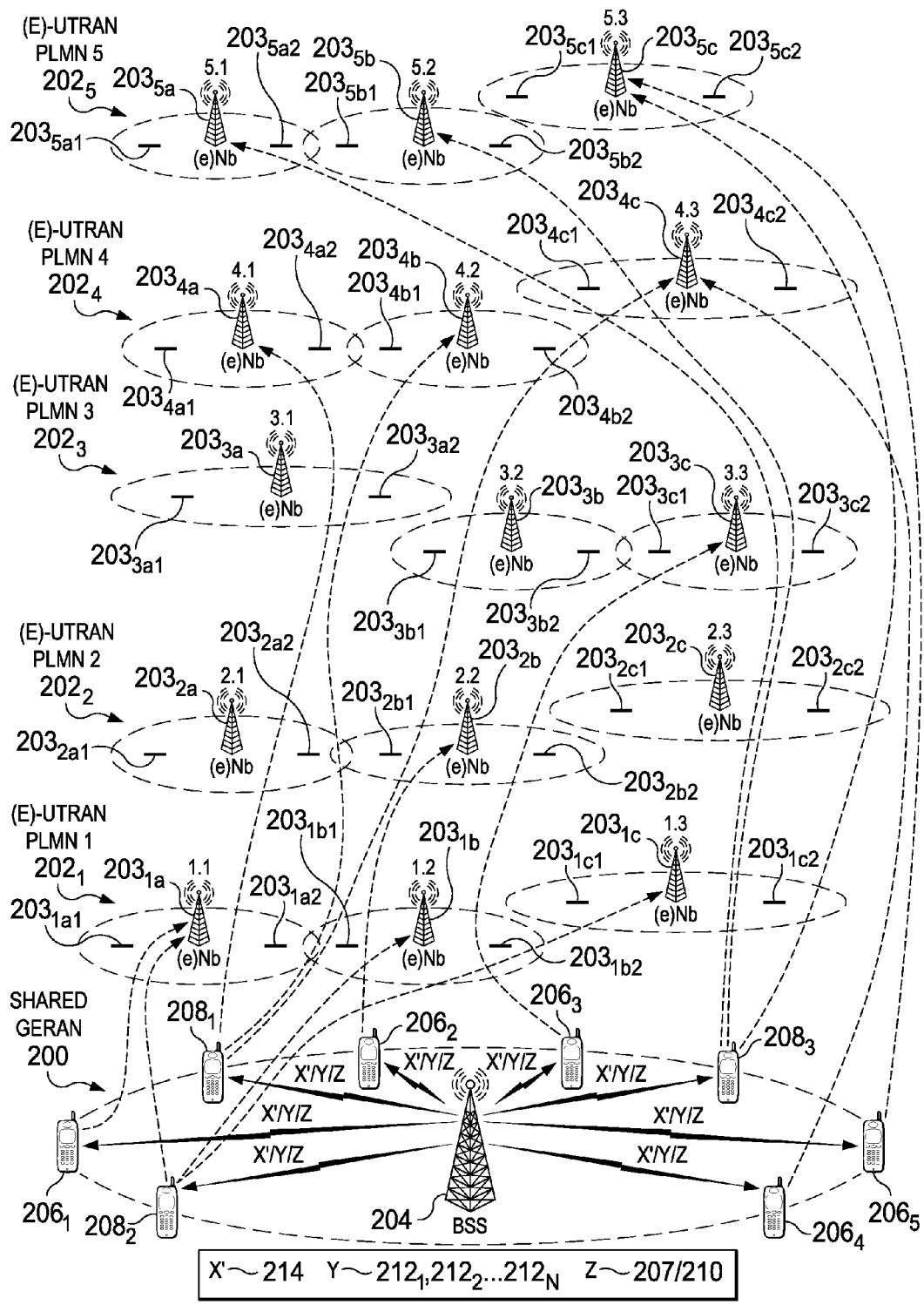
FIG. 2 is a basic diagram that illustrates a new network sharing scenario in accordance with an embodiment of the present invention.

Referring to FIG. 2, there is a basic diagram that illustrates an exemplary network sharing scenario in accordance with an embodiment of the present invention. In this exemplary network sharing scenario, multiple operators share a GERAN radio access network 200 (which has an enhanced BSS 204) while at the same time each operator has their own dedicated E-UTRAN/UTRAN radio access network $202_1$, $202_2$, $202_3$, $202_4$ and $202_5$. Each E-UTRAN/UTRAN radio access network $202_1$, $202_2$, $202_3$, $202_4$ and $202_5$ is respectively referred to herein as PLMN $202_1$, $202_2$, $202_3$, $202_4$ and $202_5$ (illustrated as PLMN1, PLMN2, PLMN3, PLMN4, and PLMN5) and each of these has one or more corresponding (e)NodeBs $203_{1a}$, $203_{1b}$, $203_{1c}$, $203_{2a}$, $203_{2b}$, $203_{2c}$, $203_{3a}$, $203_{3b}$, $203_{3c}$, $203_{4a}$, $203_{4b}$, $203_{4c}$, and $203_{5a}$, $203_{5b}$, $203_{5c}$. In this example, each PLMN $202_1$, $202_2$, $202_3$, $202_4$ and $202_5$ is shown as having three (e)NodeBs but it could be any number of (e)NodeBs. Further, each (e)NodeB $203_{1a}$, $203_{1b}$, $203_{1c}$, $203_{2a}$, $203_{2b}$, $203_{2c}$, $203_{3a}$, $203_{3b}$, $203_{3c}$, $203_{4a}$, $203_{4b}$, $203_{4c}$, and $203_{5a}$, $203_{5b}$, $203_{5c}$ is shown respectively supporting two cells $203_{1a1}$, $203_{1a2}$, $203_{1b1}$, $203_{1b2}$, $203_{1c1}$, $203_{1c2}$, $203_{2a1}$, $203_{2a2}$, $203_{2b1}$, $203_{2b2}$, $203_{2c1}$, $203_{2c2}$, $203_{3a1}$, $203_{3a2}$, $203_{3b1}$, $203_{3b2}$, $203_{3c1}$, $203_{3c2}$, $203_{4a1}$, $203_{4a2}$, $203_{4b1}$, $203_{4b2}$, $203_{4c1}$, $203_{4c2}$, $203_{5a1}$, $203_{5a2}$, $203_{5b1}$, $203_{5b2}$, $203_{5c1}$, $203_{5c2}$. However, it should be appreciated that each (e)NodeB $203_{1a}$, $203_{1b}$, $203_{1c}$, $203_{2a}$, $203_{2b}$, $203_{2c}$, $203_{3a}$, $203_{3b}$, $203_{3c}$, $203_{4a}$, $203_{4b}$, $203_{4c}$, and $203_{5a}$, $203_{5b}$, $203_{5c}$ can support any number of cells and that they all do not need to support the same number of cells.

The BSS 204 broadcasts a SI3 message 207 which indicates it's support for network sharing to legacy mobile stations $206_1$, $206_2$, $206_3$, $206_4$ and $206_5$ (only five shown) and supporting mobile stations $208_1$, $208_2$ and $208_3$ (only three shown). Further, the BSS 204 broadcasts specific network sharing information in SI22 message 210 to the legacy mobile stations $206_1$, $206_2$, $206_3$, $206_4$ and $206_5$ and the supporting mobile stations $208_1$, $208_2$ and $208_3$. In the illustrated example, the legacy mobile stations $206_1$, $206_2$, $206_3$, $206_4$ and $206_5$ are considered to be registered with the common PLMN of the shared GERAN network 200 and are respectively programmed with PLMN1, PLMN2, PLMN3, PLMN4, and PLMN5 as their preferred PLMNs. The supporting mobile stations $208_1$, $208_2$ and $208_3$ are respectively programmed with PLMN4, PLMN1, and PLMN5 which are their preferred PLMNs and are respectively registered with PLMN4, PLMN1, and PLMN5 of the shared GERAN network 200.

The BSS 204 is configured to sequentially broadcast a set of first system information messages $212_1$, $212_2$ ... $212_n$ where each message $212_1$, $212_2$ ... $212_n$ that is broadcasted contains UTRAN/E-UTRAN neighbor cell information $213_{a1}$, $213_{a2}$ ... $213_{an}$ associated with one or more of the PLMNs $202_1$, $202_2$, $202_3$, $202_4$ and $202_5$ for use by the legacy mobile stations $206_1$, $206_2$, $206_3$, $206_4$ and $206_5$ (see also FIG. 3A for more detailed representation of the first system information messages $212_1$, $212_2$ ... $212_n$ and discussion about the differences including the order of information and/or which information is listed in the neighbor cell information $213_{a1}$, $213_{a2}$ ... $213_{an}$). In one example, the BSS 204 is configured to sequentially broadcast the set of the first system information messages $212_1$, $212_2$ ... $212_n$ in the form of SI2quater messages $212_{a1}$, $212_{a2}$ ... $212_{an}$ (each respectively including neighbor cell information $213_{a1}$, $213_{a2}$ ... $213_{an}$ providing information such as UTRAN's cell and frequency information and/or E-UTRAN's frequencies, thresholds) which are used by the legacy mobile stations $206_1$, $206_2$, $206_3$, $206_4$, and $206_5$ for idle mode cell (re)selection. In another example, the BSS 204 is configured to sequentially broadcast the set of the first system information messages $212_1$, $212_2$ ... $212_n$ in the form of pairs of SI2quater messages $212_{a1}$, $212_{a2}$ ... $212_{an}$ (each respectively including neighbor cell information $213_{a1}$, $213_{a2}$ ... $213_{an}$ providing information such as UTRAN's cell and frequency information and/or E-UTRAN's frequencies, thresholds) and SI2ter messages $212_{b1}$, $212_{b2}$ ... $212_{bn}$ (each respectively including neighbor cell information $213_{a1'}$, $213_{a2'}$ ... $213_{an'}$ providing information such as UTRAN frequencies, thresholds) which are used by the legacy mobile stations $206_1$, $206_2$, $206_3$, $206_4$ and $206_5$ for idle mode cell (re)selection.

The SI2quater messages $212_{a1}$, $212_{a2}$ ... $212_{an}$ may each contain up to eight data elements $215_1$, $215_2$ ... $215_8$ which contain information that collectively represents the neighbor cell information $213_{a1}$, $213_{a2}$ ... $213_{an}$ (e.g., see TABLE #2). For example, the neighbor cell information $213_{a1}$ could be placed in eight data elements $215_1$, $215_2$ ... $215_8$ and the neighbor cell information $213_{a2}$ could be placed in eight data elements $215_1$, $215_2$ ... $215_8$ etc. ... Alternatively, the SI2quater messages $212_{a1}$, $212_{a2}$ ... $212_{an}$ may each have three data elements $215_1$, $215_2$, $215_3$ in order to match the operational aspects of the legacy mobile stations $206_1$, $206_2$, $206_3$, $206_4$ and $206_5$ which are typically configured to monitor three frequencies per RAT and mode (FDD or TDD) (e.g., see TABLE #3). In another example, the SI2quater messages $212_{a1}$, $212_{a2}$ ... $212_{an}$ and SI2ter messages $212_{b1}$, $212_{b2}$ ... $212_{bn}$ when paired together may collectively have three data elements $215_1$, $215_2$, $215_3$ in order to match the operational aspects of the legacy mobile stations $206_1$, $206_2$, $206_3$, $206_4$ and $206_5$ which are typically configured to monitor three frequencies per RAT and mode (FDD or TDD) (e.g., see TABLE #4). In any case, the BSS 204 broadcasts different versions of the SI2quater messages $212_{a1}$, $212_{a2}$ ... $212_{an}$ or pairs of SI2quater messages $212_{a1}$, $212_{a2}$ ... $212_{an}$ and SI2ter messages $212_{b1}$, $212_{b2}$ ... $212_{bn}$ in a round-robin fashion (for example) for the legacy mobile stations $206_1$, $206_2$, $206_3$, $206_4$ and $206_5$ (see TABLES #1-#7). The BSS 204 by broadcasting different versions of the SI2quater messages $212_{a1}$, $212_{a2}$ ... $212_{an}$ or pairs of SI2quater messages $212_{a1}$, $212_{a2}$ ... $212_{an}$ and SI2ter messages $212_{b1}$, $212_{b2}$ ... $212_{bn}$ effectively enhances the overall probability (over time) that a legacy mobile station $206_1$, $206_2$, $206_3$, $206_4$ and $206_5$ in a network sharing scenario will find frequency information, cell information or combination of both within the broadcasted messages that provide continuity with the respective legacy mobile station's registered PLMN (i.e. the Common PLMN of the GERAN network 200) as determined by the respective legacy mobile station's preferred PLMN(s) which may include one or more of PLMN $202_1$, $202_2$, $202_3$, $202_4$ and $202_5$.

Figure 1:
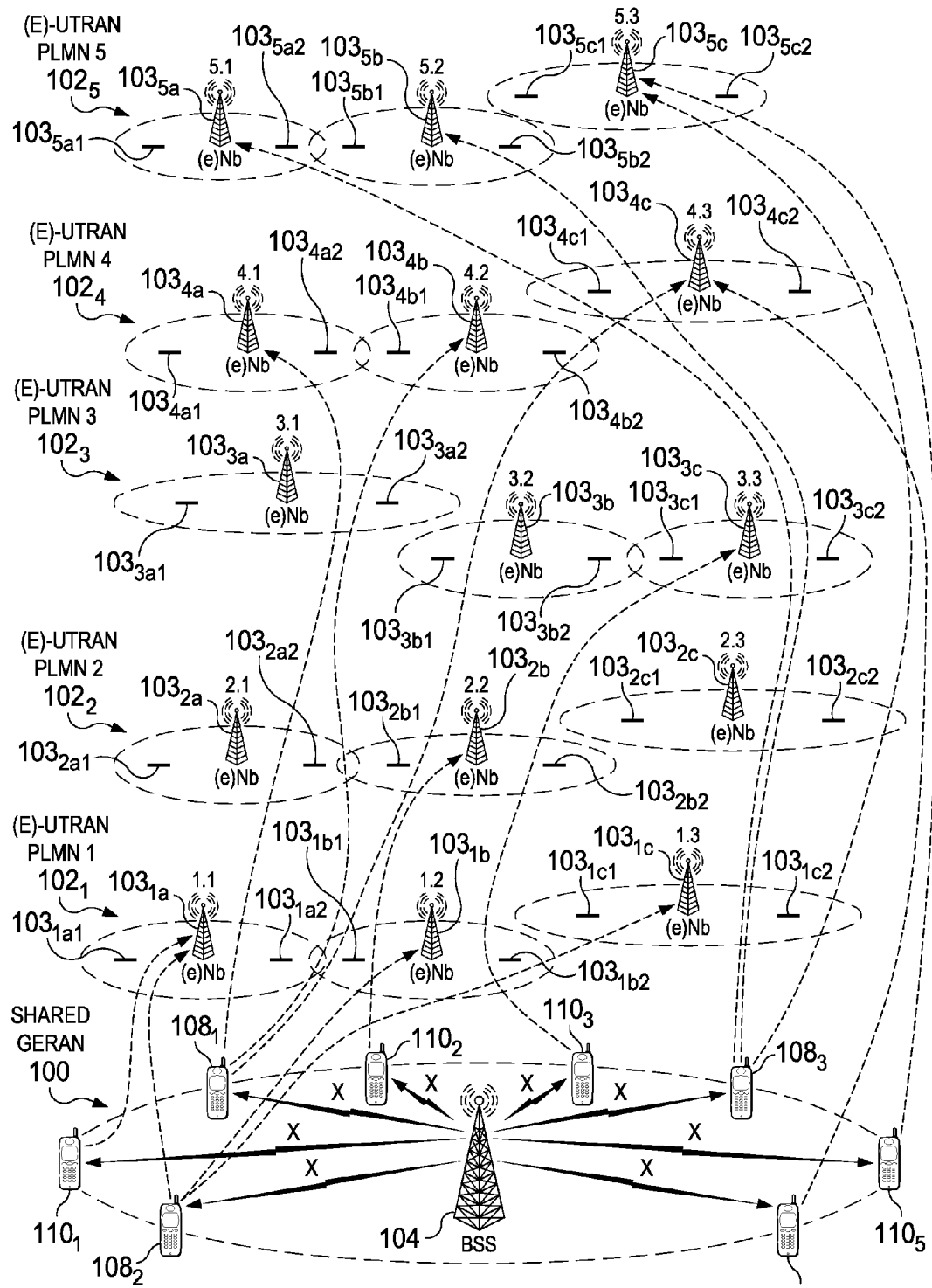
FIG. 1 (PRIOR ART) is a basic diagram that illustrates a traditional network sharing scenario which has problems that are addressed by the present invention.
Figure 3A:
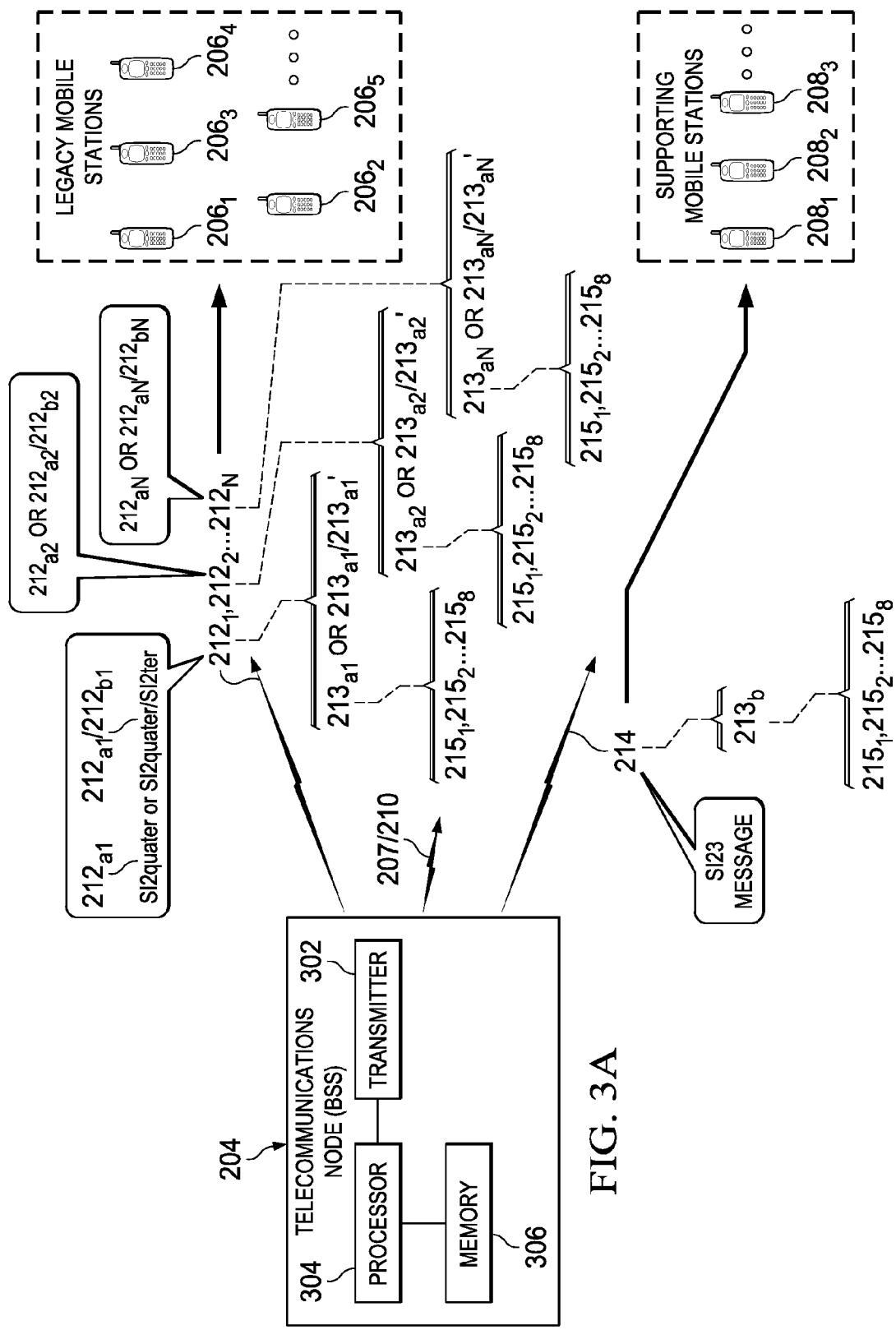
FIGS. 3A-3B respectively show a diagram illustrating the basic components of a BSS and a flowchart illustrating the basic steps of a method which is implemented by the BSS in accordance with an embodiment of the present invention.

In addition, the BSS 204 is also configured to periodically broadcast a second system information message 214 which contains UTRAN/E-UTRAN neighbor cell information $213b$ associated with one or more of the PLMNs $202_1$, $202_2$, $202_3$, $202_4$ and $202_5$ for use by the supporting mobile stations $208_1$, $208_2$ and $208_3$ (only three shown). In the past, the traditional BSS 104 would broadcast and re-broadcast the same traditional SI2quater message 106a or pairs of the traditional SI2quater message 106a and traditional SI2ter message 106b for both the supporting mobile stations $108_1$, $108_2$ and $108_3$ and the legacy mobile stations $110_1$, $110_2$, $110_3$, $110_4$ and $110_5$ as shown in FIG. 1 (assuming the network configurations did not change). However, as shown in FIGS. 2 and 3A, the enhanced BSS 204 is configured to sequentially broadcast and re-broadcast a set of SI2quater messages $212_{a1}$, $212_{a2}$ ... $212_{an}$ or a set of pairs of SI2quater messages $212_{a1}$, $212_{a2}$ ... $212_{an}$ and SI2ter messages $212_{b1}$, $212_{b2}$ ... $212_{bn}$ for use by the legacy mobile stations $206_1$, $206_2$, $206_3$, $206_4$ and $206_5$ while also broadcasting the message 214 for use by the supporting mobile stations $208_1$, $208_2$ and $208_3$ (assuming the network configurations did not change). This scheme which is implemented by the enhanced BSS 204 effectively addresses the problems of the state-of-the-art. A detailed discussion is provided below to describe the specific configurations, operations and features of the enhanced BSS 204, the legacy mobile stations $206_1$, $206_2$, $206_3$, $206_4$ and $206_5$, and the supporting mobile stations $208_1$, $208_2$ and $208_3$.

Figure 3B:
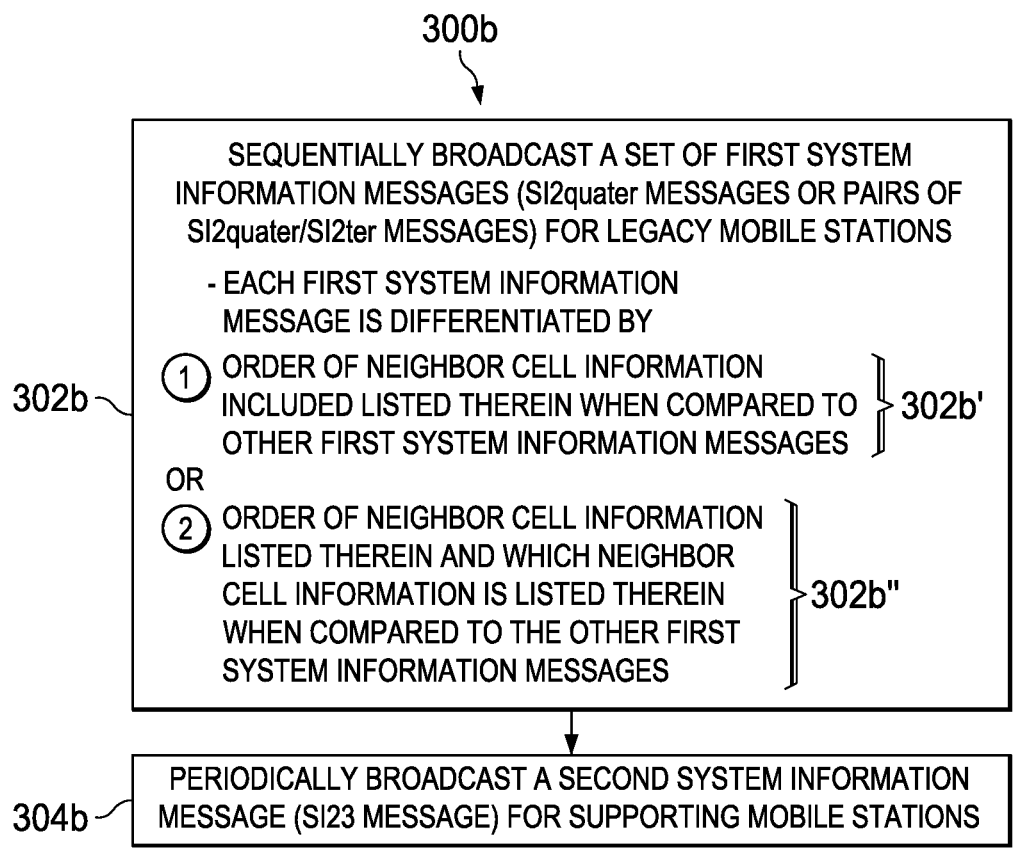

Referring to FIGS. 3A-3B, there are respectively shown a diagram illustrating the basic components of the BSS 204 and a flowchart illustrating the basic steps of a network sharing method 300b which is implemented by the BSS 204 in accordance with an embodiment of the present invention. As shown in FIG. 3A, the BSS 204 (telecommunications node 204) comprises at least a transmitter 302, a processor 304, and a memory 306 that stores processor-executable instructions where the processor 304 interfaces with the memory 306 and executes the processor-executable instructions to implement the network sharing method 300b by enabling two broadcast steps 302b and 304b. In broadcast step 302b, the transmitter 302 sequentially broadcasts a set of the first system information messages $212_1$, $212_2$ ... $212_n$ for use by the legacy mobile stations $206_1$, $206_2$, $206_3$, $206_4$ and $206_5$, wherein each one of the first system information messages $212_1$, $212_2$ ... $212_n$ is differentiated by an order of neighbor cell information $213_{a1}$, $213_{a2}$ ... $213_{an}$, $213_{a1'}$, $213_{a2'}$ ... $213_{an'}$ listed therein when compared to the other first system information messages $212_1$, $212_2$ ... $212_n$ (note: the neighbor cell information $213_{a1}$, $213_{a2}$ ... $213_{an}$, $213_{a1'}$, $213_{a2'}$ ... $213_{an'}$ associated with one or more of the dedicated radio access networks $202_1$, $202_2$, $202_3$, $202_4$ and $202_5$) (see FIG. 3B's step 302b'). If desired, the transmitter 302 can sequentially broadcast a set of the first system information messages $212_1$, $212_2$ ... $212_n$ for use by the legacy mobile stations $206_1$, $206_2$, $206_3$, $206_4$ and $206_5$, wherein each one of the first system information messages $212_1$, $212_2$ ... $212_n$ is not only differentiated by an order of neighbor cell information $213_{a1}$, $213_{a2}$ ... $213_{an}$, $213_{a1'}$, $213_{a2'}$ ... $213_{an'}$ listed therein but is also differentiated by which neighbor cell information $213_{a1}$, $213_{a2}$ ... $213_{an}$, $213_{a1'}$, $213_{a2'}$ ... $213_{an'}$ is listed therein when compared to the other first system information messages $212_1$, $212_2$ ... $212_n$ (see FIG. 3B's step 302b"). In broadcast step 304b, the transmitter 302 periodically broadcasts the second system information message 214 for the supporting mobile stations $208_1$, $208_2$ and $208_3$, wherein the second system information message 214 contains neighbor cell information $213b$ associated with one or more of the dedicated radio access networks $202_1$, $202_2$, $202_3$, $202_4$ and $202_5$ (see FIG. 3B's step 304b). The transmitter 302 would repeatedly broadcast in a sequential manner the same set of the first system information messages $212_1$, $212_2$ ... $212_n$ wherein one complete set is transmitted within a time period of 1-10 minutes (for example) and periodically broadcast the same second system information message 214 within a time period of around 10-30 seconds (for example) assuming the neighbor RAT configurations are static (i.e. none of the PLMNs $202_1$, $202_2$, $202_3$, $202_4$ and $202_5$ have been changed to implement different frequencies or a different number of cells). It should be appreciated that the legacy mobile stations $206_1$, $206_2$, $206_3$, $206_4$ and $206_5$ would receive both the first system information messages $212_1$, $212_2$ ... $212_n$ and the second system information message 214 but will only act on the first system information messages $212_1$, $212_2$ ... $212_n$ since they are not programmed to understand the second system information message 214. Likewise, it should be appreciated that the supporting mobile stations $208_1$, $208_2$ and $208_3$ would receive both the first system information messages $212_1$, $212_2$ ... $212_n$ and the second system information message 214 but will typically act on the second system information messages 214 to obtain the neighbor cell information $213b$. Finally, it should be appreciated that the BSS 204 includes other components which are well known to those skilled in the art but only the components which are needed to explain and enable the present invention are described herein.

The BSS 204 is configured to perform step 302b by sequentially broadcasting the set of the first system information messages $212_1$, $212_2$ ... $212_n$ or use by the legacy mobile stations $206_1$, $206_2$, $206_3$, $206_4$ and $206_5$, where each broadcasted message $212_1$, $212_2$ ... $212_n$ respectively contains UTRAN/E-UTRAN neighbor cell information $213_{a1}$, $213_{a2}$ ... $213_{an}$ associated with one or more of the PLMNs $202_1$, $202_2$, $202_3$, $202_4$ and $202_5$ (note: the neighbor cell information $213_{a1}$, $213_{a2}$ ... $213_{an}$ are differentiated from one another by the order and if desired which information is listed therein). In one example, the broadcasted set of first system information messages $212_1$, $212_2$ ... $212_n$ are SI2quater messages $212_{a1}$, $212_{a2}$ ... $212_{an}$ where each SI2quater message $212_{a1}$, $212_{a2}$ ... $212_{an}$ contains neighbor cell information $213_{a1}$, $213_{a2}$ ... $213_{an}$ such as UTRAN's cell and frequency information and/or E-UTRAN's frequencies, thresholds which are used by the legacy mobile stations $206_1$, $206_2$, $206_3$, $206_4$ and $206_5$ for idle mode cell (re)selection. In another example, the broadcasted set of the first system information messages $212_1$, $212_2$ ... $212_n$ are pairs of SI2quater messages $212_{a1}$, $212_{a2}$ ... $212_{an}$ (each respectively including neighbor cell information $213_{a1}$, $213_{a2}$ ... $213_{an}$ such as UTRAN's cell and frequency information and/or E-UTRAN's frequencies, thresholds) and SI2ter messages $212_{b1}$, $212_{b2}$ ... $212_{bn}$ (each respectively including neighbor cell information $213_{a1'}$, $213_{a2'}$ ... $213_{an'}$ such as UTRAN frequencies, thresholds) which are used by the legacy mobile stations $206_1$, $206_2$, $206_3$, $206_4$ and $206_5$ for idle mode cell (re)selection.

The SI2quater messages $212_{a1}$, $212_{a2}$ ... $212_{an}$ may each contain up to eight data elements $215_1$, $215_2$ ... $215_8$ which collectively contain information that represents the neighbor cell information $213_{a1}$, $213_{a2}$ ... $213_{an}$ (e.g., see TABLE #2). For example, the neighbor cell information $213_{a1}$ could be placed in eight data elements $215_1$, $215_2$ ... $215_8$ and the neighbor cell information $213_{a2}$ could be placed in eight data elements $215_1$, $215_2$ ... $215_8$ etc. . . . Alternatively, the SI2quater messages $212_{a1}, 212_{a2} \ldots 212_{an}$ may each have three data elements $215_1, 215_2, 215_3$ in order to match the operational aspects of the legacy mobile stations $206_1, 206_2, 206_3, 206_4$ and $206_5$ which are typically configured to monitor three frequencies per RAT and mode (e.g., see TABLE #3). In another example, the SI2quater messages $212_{a1}, 212_{a2} \ldots 212_{an}$ and SI2ter messages $212_{b1}, 212_{b2} \ldots 212_{bn}$ when paired together may collectively have three data elements $215_1, 215_2, 215_3$ in order to match the operational aspects of the legacy mobile stations $206_1, 206_2, 206_3, 206_4$ and $206_5$ which are typically configured to monitor three frequencies per RAT and mode (e.g., see TABLE #4). In any case, the BSS 204 sequentially broadcasts the SI2quater messages $212_{a1}, 212_{a2} \ldots 212_{an}$ or pairs of SI2quater messages $212_{a1}, 212_{a2} \ldots 212_{an}$ and SI2ter messages $212_{b1}, 212_{b2} \ldots 212_{bn}$ in a round-robin fashion (for example) for the legacy mobile stations $206_1, 206_2, 206_3, 206_4$ and $206_5$. The BSS 204, by sequentially broadcasting the SI2quater messages $212_{a1}, 212_{a2} \ldots 212_{an}$ which contain neighbor cell information $213_{a1}, 213_{a2} \ldots 213_{an}$ or pairs of SI2quater messages $212_{a1}, 212_{a2} \ldots 212_{an}$ and SI2ter messages $212_{b1}, 212_{b2} \ldots 212_{bn}$ which contain neighbor cell information $213_{a1}, 213_{a2} \ldots 213_{an}, 213_{a1'}, 213_{a2'} \ldots 213_{an'}$ which are differentiated from one another by the order and if desired which information is listed therein, effectively enhances the overall probability (over time) that a legacy mobile station $206_1, 206_2, 206_3, 206_4$ and $206_5$ in a network sharing scenario will find frequency information, cell information or combination of both within the broadcasted messages that provide continuity with the respective legacy mobile station's registered PLMN (i.e. the Common PLMN of the GERAN network 200) as determined by the respective legacy mobile station's preferred PLMN(s) which may include one or more of PLMN $202_1, 202_2, 202_3, 202_4$ and $202_5$.

The following are some examples of how the BSS 204 can perform step 302b and sequentially broadcast the set of the first system information messages $212_1, 212_2 \ldots 212_n$ for use by the legacy mobile stations $206_1, 206_2, 206_3, 206_4$ and $206_5$ in accordance with the present invention.

TABLE #1

| PLMN 1 | PLMN 2 | PLMN 3 | PLMN 4 | PLMN 5 |
|---|---|---|---|---|
| 1.1 | 2.1 | 3.1 | 4.1 | 5.1 |
| 1.2 | 2.2 | 3.2 | 4.2 | 5.2 |
| 1.3 | 2.3 | 3.3 | 4.3 | 5.3 |

The PLMNs 1, 2, 3, 4, and 5 for the purpose of the discussion hereinafter with respect to TABLES #2-4 are configured to each have one cell per frequency and support three frequencies which are indicated per the following notation PLMN#.Frequency#. For instance, PLMN 1's first frequency is represented as "1.1", PLMN 5's third frequency is represented as "5.3", and PLMN 3's second frequency is represented as "3.2".

TABLE #2

| | SI2quater message rotation | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| frequency 1 | 1.1 | 2.1 | 3.1 | 4.1 | 5.1 | 1.2 | 2.2 | 3.2 | 4.2 | 5.2 | 1.3 | 2.3 | 3.3 | 4.3 | 5.3 |
| frequency 2 | 2.1 | 3.1 | 4.1 | 5.1 | 1.2 | 2.2 | 3.2 | 4.2 | 5.2 | 1.3 | 2.3 | 3.3 | 4.3 | 5.3 | 1.1 |
| frequency 3 | 3.1 | 4.1 | 5.1 | 1.2 | 2.2 | 3.2 | 4.2 | 5.2 | 1.3 | 2.3 | 3.3 | 4.3 | 5.3 | 1.1 | 2.1 |
| frequency 4 | 4.1 | 5.1 | 1.2 | 2.2 | 3.2 | 4.2 | 5.2 | 1.3 | 2.3 | 3.3 | 4.3 | 5.3 | 1.1 | 2.1 | 3.1 |
| frequency 5 | 5.1 | 1.2 | 2.2 | 3.2 | 4.2 | 5.2 | 1.3 | 2.3 | 3.3 | 4.3 | 5.3 | 1.1 | 2.1 | 3.1 | 4.1 |
| frequency 6 | 1.2 | 2.2 | 3.2 | 4.2 | 5.2 | 1.3 | 2.3 | 3.3 | 4.3 | 5.3 | 1.1 | 2.1 | 3.1 | 4.1 | 5.1 |
| frequency 7 | 2.2 | 3.2 | 4.2 | 5.2 | 1.3 | 2.3 | 3.3 | 4.3 | 5.3 | 1.1 | 2.1 | 3.1 | 4.1 | 5.1 | 1.2 |
| frequency 8 | 3.2 | 4.2 | 5.2 | 1.3 | 2.3 | 3.3 | 4.3 | 5.3 | 1.1 | 2.1 | 3.1 | 4.1 | 5.1 | 1.2 | 2.2 |

TABLE #2 illustrates an example where the BSS 204 broadcasts a rotation of SI2quater messages $212_{a1}, 212_{a2} \ldots 212_{a15}$ when all 5 PLMNs each have three frequencies, and each SI2quater message $212_{a1}, 212_{a2} \ldots 212_{a15}$ respectively contains eight data elements $215_1, 215_2 \ldots 215_8$ which contain information that collectively represents one of the neighbor cell information $213_{a1}, 213_{a2} \ldots 213_{a15}$. In this example, the table's SI2quater message rotation 1, 2, ... 15 represents SI2quater messages $212_{a1}, 212_{a2} \ldots 212_{a15}$ and the table's frequency 1, 2, ... 8 represents the eight data elements $215_1, 215_2 \ldots 215_8$. As such, the SI2quater message $212_{a1}$ (SI2quater message rotation 1) contains neighbor cell information $213_{a1}$ within eight data elements $215_1, 215_2, 215_3, 215_4, 215_5, 215_6, 215_7, 215_8$ ("1.1", "2.1", "3.1", "4.1", "5.1", "1.2", "2.2", and "3.2"). As can be appreciated, the BSS 204's broadcasted SI2quater messages $212_{a1}, 212_{a2} \ldots 212_{a15}$ satisfies broadcast step 302b's scheme (round-robin scheme) wherein each one of the broadcasted first system information messages $212_1, 212_2 \ldots 212_{15}$ is differentiated by (1) an order of the neighbor cell information $213_{a1}, 213_{a2} \ldots 213_{a15}$ listed therein and (2) which neighbor cell information $213_{a1}, 213_{a2} \ldots 213_{a15}$ is listed therein when compared to the other broadcasted first system information messages $212_1, 212_2 \ldots 212_{15}$ (note: reference number (2) related to which neighbor cell information $213_{a1}, 213_{a2} \ldots 213_{a15}$ is listed therein can be used if there is more cell information available than can fit within any one message $212_1, 212_2 \ldots 212_{15}$ considering the limit on the maximum number of data elements any given message is allowed to include).

It should be noted that each one of the set of the first system information messages $212_1, 212_2 \ldots 212_n$ in practice can be realized by the BSS 204 transmitting one or more instances of a BCCH SI2quater message. As such, the set of data elements $215_1, 215_2 \ldots 215_n$ conveyed by any given SI2quater message $212_{a1}, 212_{a2} \ldots 212_{an}$ may involve the BSS 204 transmitting of one or more instances of the BCCH SI2quater message, wherein any given instance may include one or more of the data elements $215_1, 215_2 \ldots 215_n$ (i.e. the set of "n" data elements may be conveyed using an equal or lesser number of instances of the BCCH SI2quater message). For exemplary purposes it may be assumed that a set of "n" data elements will be conveyed using "n" instances of the BCCH SI2quater message.

TABLE #3

| | SI2quater rotation | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| frequency 1 | 1.1 | 2.1 | 3.1 | 4.1 | 5.1 | 1.2 | 2.2 | 3.2 | 4.2 | 5.2 | 1.3 | 2.3 | 3.3 | 4.3 | 5.3 |
| frequency 2 | 2.1 | 3.1 | 4.1 | 5.1 | 1.2 | 2.2 | 3.2 | 4.2 | 5.2 | 1.3 | 2.3 | 3.3 | 4.3 | 5.3 | 1.1 |
| frequency 3 | 3.1 | 4.1 | 5.1 | 1.2 | 2.2 | 3.2 | 4.2 | 5.2 | 1.3 | 2.3 | 3.3 | 4.3 | 5.3 | 1.1 | 2.1 |

TABLE #3 illustrates an example where the BSS 204 broadcasts a rotation of SI2quater messages $212_{a1}, 212_{a2} \ldots 212_{a15}$ when all 5 PLMNs each have three frequencies, and each SI2quater message $212_{a1}, 212_{a2} \ldots 212_{a15}$ respectively contains three data elements $215_1$, $215_2$, and $215_3$ which contain information that collectively represent one element of the neighbor cell information $213_{a1}, 213_{a2} \ldots 213_{a15}$. In this example, the table's SI2quater message rotation 1, 2 ... 15 represents SI2quater message $212_{a1}, 212_{a2} \ldots 212_{a15}$ and the table's frequency 1, 2, 3 represents the three data elements $215_1$, $215_2$, $215_3$. As such, the SI2quater message $212_{a1}$ (SI2quater message rotation 1) contains neighbor cell information $213_{a1}$ within three data elements $215_1$, $215_2$, $215_3$ ("1.1", "2.1", "3.1"). As can be seen in this example, BSS 204's broadcasted SI2quater messages $212_{a1}, 212_{a2} \ldots 212_{a15}$ satisfies broadcast step 302b's scheme (round-robin scheme) wherein each one of the broadcasted first system information messages $212_1, 212_2 \ldots 212_{15}$ is differentiated by (1) an order of the neighbor cell information $213_{a1}, 213_{a2} \ldots 213_{a15}$ listed therein and (2) which neighbor cell information $213_{a1}, 213_{a2} \ldots 213_{a15}$ is listed therein when compared to the other broadcasted first system information messages $212_1, 212_2 \ldots 212_{15}$ (note: reference number (2) related to which neighbor cell information $213_{a1}, 213_{a2} \ldots 213_{a15}$ is listed therein can be used if there is more cell information available than can fit within any one message $212_1, 212_2 \ldots 212_{15}$ considering the limit on the maximum number of data elements any given message is allowed to include).

message rotation 1, 2 ... 15 represents SI2ter message $212_{b1}, 212_{b2} \ldots 212_{b15}$ and SI2quater message $212_{a1}, 212_{a2} \ldots 212_{a15}$ and the table's frequency 1, 2, 3 represents the three data elements $215_1$, $215_2$, $215_3$. As such, the rotation #1 includes the SI2ter message $212_{b1}$ which has one data element $215_1$ ("1.1") and the SI2quater message $212_{a1}$ which has two data elements $215_2$ and $215_3$ ("2.1", "3.1") where all three data elements $215_1$, $215_2$, and $215_3$ contain information which collectively represents neighbor cell information $213_{a1}/213_{a1'}$. In any case, the BSS 204's broadcasted pair of SI2quater messages $212_{a1}, 212_{a2} \ldots 212_{a15}$ and SI2ter messages $212_{b1}, 212_{b2} \ldots 212_{b15}$ (collectively first system information messages $212_1, 212_2 \ldots 212_{15}$) satisfies step 302b's scheme (round-robin scheme) wherein each one of the broadcasted first system information messages $212_1, 212_2 \ldots 212_{15}$ is differentiated by (1) an order of the neighbor cell information $213_{a1}/213_{a1'}, 213_{a2}/213_{a2'} \ldots 213_{a15}213_{a15'}$ listed therein and (2) which neighbor cell information $213_{a1}/213_{a1'}, 213_{a2}/213_{a2'} \ldots 213_{a15}213_{a15'}$ is listed therein when compared to the other broadcasted first system information messages $212_1, 212_2 \ldots 212_{15}$ (note: reference number (2) related to which neighbor cell information $213_{a1}/213_{a1'}, 213_{a2}/213_{a2'}, \ldots 213_{a15}213_{a15'}$ is listed therein can be used if there is more cell information available that can fit within any one message $212_1, 212_2 \ldots 212_{15}$ considering the limit on the maximum number of data elements any given message is allowed to include).

TABLE #4

| | Rotation# | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| SI2ter | | | | | | | | | | | | | | | |
| frequency 1 | 1.1 | 2.1 | 3.1 | 4.1 | 5.1 | 1.2 | 2.2 | 3.2 | 4.2 | 5.2 | 1.3 | 2.3 | 3.3 | 4.3 | 5.3 |
| SI2quater | | | | | | | | | | | | | | | |
| frequency 2 | 2.1 | 3.1 | 4.1 | 5.1 | 1.2 | 2.2 | 3.2 | 4.2 | 5.2 | 1.3 | 2.3 | 3.3 | 4.3 | 5.3 | 1.1 |
| frequency 3 | 3.1 | 4.1 | 5.1 | 1.2 | 2.2 | 3.2 | 4.2 | 5.2 | 1.3 | 2.3 | 3.3 | 4.3 | 5.3 | 1.1 | 2.1 |

TABLE #4 illustrates an example which is applicable only to UTRAN frequencies where the BSS 204 broadcasts a rotation of pairs of SI2quater messages $212_{a1}, 212_{a2} \ldots 212_{a15}$ and SI2ter messages $212_{b1}, 212_{b2} \ldots 212_{b15}$ when all 5 PLMNs each have three frequencies, and each SI2ter message $212_{b1}, 212_{b2} \ldots 212_{b15}$ respectively contains one data element $215_1$ and each SI2quater message $212_{a1}, 212_{a2} \ldots 212_{a15}$ respectively contains two data elements $215_2$ and $215_3$ where all three data elements $215_1$, $215_2$, and $215_3$ contain information which collectively represents one of the neighbor cell information $213_{a1}/213_{a1'}, 213_{a2}/213_{a2'} \ldots 213_{a15}213_{a15'}$. In this example, the table's SI2ter message and SI2quater

TABLE #5

| PLMN 1 | PLMN 2 | PLMN 3 | PLMN 4 | PLMN 5 |
|---|---|---|---|---|
| 1.1.1/1.1.2 | 2.1.1/2.1.2 | 3.1.1/3.1.2 | 4.1.1/4.1.2 | 5.1.1/5.1.2 |
| 1.2.1/1.2.2 | 2.2.1/2.2.2 | 3.2.1/3.2.2 | 4.2.1/4.2.2 | 5.2.1/5.2.2 |
| 1.3.1/1.3.2 | 2.3.1/2.3.2 | 3.3.1/3.3.2 | 4.3.1/4.3.2 | 5.3.1/5.3.2 |

The PLMNs 1, 2, 3, 4, and 5 for the purpose of the discussion hereinafter with respect to TABLES #6-7 are configured to each have two cells and support three frequencies which are indicated per the following notation PLMN#.Frequency#.Cell#. For instance, PLMN 1 with two cells in the PLMN 1's first frequency is represented as "1.1.1/1.1.2", PLMN 5 with two cells in the PLMN 5's third frequency is represented as "5.3.1/5.3.2", and PLMN 3 with two cells in the PLMN 3's second frequency is represented as "3.2.1/3.2.2". It should be noted that cell# is a "frequency and scrambling code".

TABLE #6

| | SI2quater rotation | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| frequency 1 | | | | | | | | | | | | | | | |
| cell 1 | 1.1.1 | 2.1.1 | 3.1.1 | 4.1.1 | 5.1.1 | 1.2.1 | 2.2.1 | 3.2.1 | 4.2.1 | 5.2.1 | 1.3.1 | 2.3.1 | 3.3.1 | 4.3.1 | 5.3.1 |
| cell2 | 1.1.2 | 2.1.2 | 3.1.2 | 4.1.2 | 5.1.2 | 1.2.2 | 2.2.2 | 3.2.2 | 4.2.2 | 5.2.2 | 1.3.2 | 2.3.2 | 3.3.2 | 4.3.2 | 5.3.2 |
| frequency 2 | | | | | | | | | | | | | | | |
| cell 1 | 2.1.1 | 3.1.1 | 4.1.1 | 5.1.1 | 1.2.1 | 2.2.1 | 3.2.1 | 4.2.1 | 5.2.1 | 1.3.1 | 2.3.1 | 3.3.1 | 4.3.1 | 5.3.1 | 1.1.1 |
| cell2 | 2.1.2 | 3.1.2 | 4.1.2 | 5.1.2 | 1.2.2 | 2.2.2 | 3.2.2 | 4.2.2 | 5.2.2 | 1.3.2 | 2.3.2 | 3.3.2 | 4.3.2 | 5.3.2 | 1.1.2 |
| frequency 3 | | | | | | | | | | | | | | | |
| cell 1 | 3.1.1 | 4.1.1 | 5.1.1 | 1.2.1 | 2.2.1 | 3.2.1 | 4.2.1 | 5.2.1 | 1.3.1 | 2.3.1 | 3.3.1 | 4.3.1 | 5.3.1 | 1.1.1 | 2.1.1 |
| cell2 | 3.1.2 | 4.1.2 | 5.1.2 | 1.2.2 | 2.2.2 | 3.2.2 | 4.2.2 | 5.2.2 | 1.3.2 | 2.3.2 | 3.3.2 | 4.3.2 | 5.3.2 | 1.1.2 | 2.1.2 |

TABLE #6 illustrates an example which is applicable only to UTRAN frequencies where the BSS 204 broadcasts a

TABLE #7

| | Rotation# | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| SI2ter | | | | | | | | | | | | | | | |
| frequency 1 | 1.1 | 2.1 | 3.1 | 4.1 | 5.1 | 1.2 | 2.2 | 3.2 | 4.2 | 5.2 | 1.3 | 2.3 | 3.3 | 4.3 | 5.3 |
| SI2quater | | | | | | | | | | | | | | | |
| frequency 2 | | | | | | | | | | | | | | | |
| cell 1 | 2.1.1 | 3.1.1 | 4.1.1 | 5.1.1 | 1.2.1 | 2.2.1 | 3.2.1 | 4.2.1 | 5.2.1 | 1.3.1 | 2.3.1 | 3.3.1 | 4.3.1 | 5.3.1 | 1.1.1 |
| cell2 | 2.1.2 | 3.1.2 | 4.1.2 | 5.1.2 | 1.2.2 | 2.2.2 | 3.2.2 | 4.2.2 | 5.2.2 | 1.3.2 | 2.3.2 | 3.3.2 | 4.3.2 | 5.3.2 | 1.1.2 |
| frequency 3 | | | | | | | | | | | | | | | |
| cell 1 | 3.1.1 | 4.1.1 | 5.1.1 | 1.2.1 | 2.2.1 | 3.2.1 | 4.2.1 | 5.2.1 | 1.3.1 | 2.3.1 | 3.3.1 | 4.3.1 | 5.3.1 | 1.1.1 | 2.1.1 |
| cell2 | 3.1.2 | 4.1.2 | 5.1.2 | 1.2.2 | 2.2.2 | 3.2.2 | 4.2.2 | 5.2.2 | 1.3.2 | 2.3.2 | 3.3.2 | 4.3.2 | 5.3.2 | 1.1.2 | 2.1.2 | rotation of SI2quater messages $212_{a1}, 212_{a2} \ldots 212_{a15}$ when all 5 PLMNs each have three frequencies and two cells, and each SI2quater message $212_{a1}, 212_{a2} \ldots 212_{a15}$ respectively contains three data elements $215_1, 215_2,$ and $215_3$ which contain information that collectively represents neighbor cell information $213_{a1}, 213_{a2} \ldots 213_{a15}$. In this example, the table's SI2quater message rotation 1, 2, ... 15 represents SI2quater message $212_{a1}, 212_{a2} \ldots 212_{a15}$ and the table's frequency 1 (two cells), 2 (two cells), 3 (two cells) each represent three data elements $215_1, 215_2, 215_3$. As such, the SI2quater message $212_{a1}$ (SI2quater message rotation 1) contains neighbor cell information $213_{a1}$ within three data elements $215_1, 215_2, 215_3$ ("1.1.1/1.1.2", "2.1.1/2.1.2", "3.1.1/3.1.2"). As can be seen, the BSS 204's broadcasted SI2quater messages $212_{a1}, 212_{a2} \ldots 212_{a15}$ satisfies broadcast step 302b's predetermined scheme (round-robin scheme) wherein each one of the broadcasted first system information messages $212_1, 212_2 \ldots 212_{15}$ is differentiated by (1) an order of the neighbor cell information $213_{a1}, 213_{a2} \ldots 213_{a15}$ listed therein and (2) which neighbor cell information $213_{a1}, 213_{a2} \ldots 213_{a15}$ is listed therein when compared to the other broadcasted first system information messages $212_1,$ $212_2 \ldots 212_{15}$ (note: reference number (2) related to which neighbor cell information $213_{a1}, 213_{a2} \ldots 213_{a15}$ is listed therein can be used if there is more cell information available that can fit within any one message $212_1, 212_2 \ldots 212_{15}$ considering the limit on the maximum number of data elements any given message is allowed to include).

TABLE #7 illustrates an example which is applicable only to UTRAN frequencies where the BSS 204 broadcasts a rotation of pairs of SI2quater messages $212_{a1}, 212_{a2} \ldots 212_{a15}$ and SI2ter messages $212_{b1}, 212_{b2} \ldots 212_{b15}$ when all 5 PLMNs each have three frequencies wherein the first frequency has one cell and the second and third frequencies have two cells, and each SI2ter message $212_{b1}, 212_{b2} \ldots 212_{b15}$ respectively contains one data element $215_1$ and each SI2quater message $212_{a1}, 212_{a2} \ldots 212_{a15}$ respectively contains two data elements $215_2$ and $215_3$ where all three data elements $215_1, 215_2,$ and $215_3$ contain information which collectively represents neighbor cell information $213_{a1}/213_{a1'}, 213_{a2}/213_{a2'} \ldots 213_{a15}213_{a15'}$. In this example, the table's SI2ter message and SI2quater message rotation 1, 2, ... 15 represents SI2ter message $212_{b1}, 212_{b2} \ldots 212_{b15}$ and SI2quater message $212_{a1}, 212_{a2} \ldots 212_{a15}$ and the table's frequency 1, 2, 3 represents the three data elements $215_1,$ $215_2, 215_3$. As such, the rotation #1 includes the SI2ter message $212_{b1}$ which has one data element $215_1$ ("1.1") and the SI2quater message $212_{a1}$ which has two data elements $215_2$ and $215_3$ ("2.1.1/2.1.2", "3.1.1/3.1.2") where all three data elements $215_1, 215_2,$ and $215_3$ contain information that collectively represents neighbor cell information $213_{a1}$. As can be seen, the BSS 204's broadcasted pairs of SI2quater messages $212_{a1}$, $212_{a2}$ ... $212_{a15}$ and SI2ter messages $212_{b1}$, $212_{b2}$ ... $212_{b15}$ (collectively first system information messages $212_1$, $212_2$ ... $212_{15}$) satisfies broadcast step 302b's scheme (round-robin scheme) wherein each one of the broadcasted first system information messages $212_1$, $212_2$ ... $212_{15}$ is differentiated by (1) an order of the neighbor cell information $213_{a1}/213_{a1'}$, $213_{a2}/213_{a2'}$ ... $213_{a15}213_{a15'}$ listed therein and (2) which neighbor cell information $213_{a1}/213_{a1'}$, $213_{a2}/213_{a2'}$ ... $213_{a15}213_{a15'}$ is listed therein when compared to the other broadcasted first system information messages $212_1$, $212_2$ ... $212_{15}$ (note: reference number (2) related to which neighbor cell information $213_{a1}/213_{a1'}$, $213_{a2}/213_{a2'}$ ... $213_{a15}213_{a15'}$ is listed therein can be used if there is more cell information available that can fit within any one message $212_1$, $212_2$ ... $212_{15}$ considering the limit on the maximum number of data elements any given message is allowed to include).

In another aspect, the BSS 204 performs broadcast step 304b by broadcasting the second system information message 214 which contains UTRAN/E-UTRAN neighbor cell information 213b associated with one or more of the PLMNs $202_1$, $202_2$, $202_3$, $202_4$ and $202_5$ to the supporting mobile stations $208_1$, $208_2$ and $208_3$ (only three shown). The BSS 204 would repeatedly and periodically broadcast the same second system information message 214 assuming that none of the PLMNs $202_1$, $202_2$, $202_3$, $202_4$ and $202_5$ are changed to have different frequencies or a different number of cells. The following is a basic representation of an exemplary second system information message 214 in accordance with the present invention.

TABLE #8

| Second System Info. Message 214 | | |
|---|---|---|
| PLMN 1 | frequency 1 | 1.1 |
|  | frequency 2 | 1.2 |
|  | frequency 3 | 1.3 |
| PLMN 2 | frequency 1 | 2.1 |
|  | frequency 2 | 2.2 |
|  | frequency 3 | 2.3 |
| PLMN 3 | frequency 1 | 3.1 |
|  | frequency 2 | 3.2 |
|  | frequency 3 | 3.3 |
| PLMN 4 | frequency 1 | 4.1 |
|  | frequency 2 | 4.2 |
|  | frequency 3 | 4.3 |
| PLMN 5 | frequency 1 | 5.1 |
|  | frequency 2 | 5.2 |
|  | frequency 3 | 5.3 |

Figure 4A:
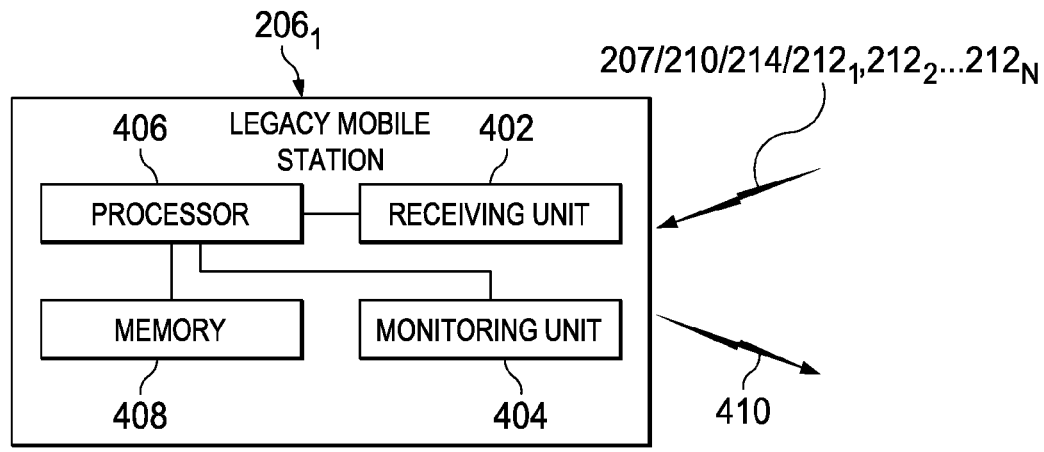
FIGS. 4A-4B respectively show a diagram illustrating the basic components of a legacy mobile station and a flowchart illustrating the basic steps of a method which is implemented by the legacy mobile station in accordance with an embodiment of the present invention.
Figure 4B:
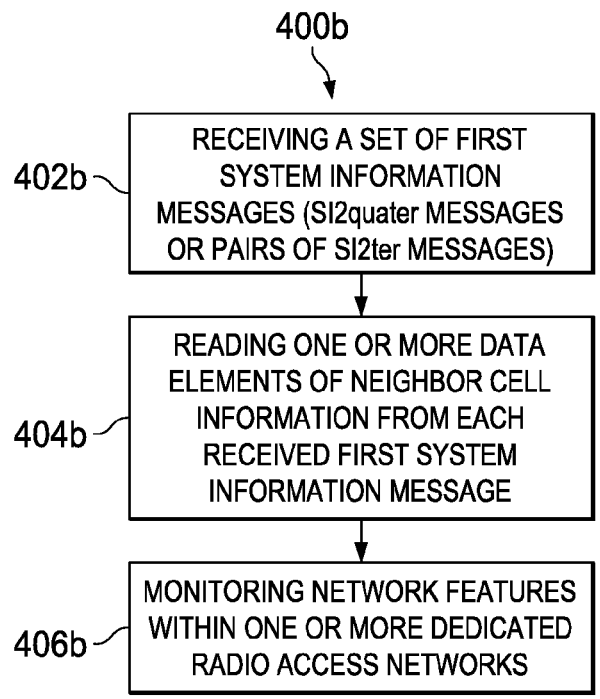

Referring to FIGS. 4A-4B, there are respectively shown a diagram illustrating the basic components of the legacy mobile station $206_1$ (for example) and a flowchart illustrating the basic steps of a method 400b which is implemented by the legacy mobile station $206_1$ in accordance with an embodiment of the present invention. As shown in FIG. 4A, the legacy mobile station $206_1$ comprises at least a receiving unit 402, a monitoring unit 404, a processor 406, and a memory 408 that stores processor-executable instructions where the processor 406 interfaces with the memory 408 and executes the processor-executable instructions to implement the method 400 by enabling a receiving step 402b, a reading step 404b, and a monitoring step 406b. In the receiving step 402b, the receiving unit 402 receives a set of first system information messages $212_1$, $212_2$ ... $212_n$, wherein each one of the received first system information messages $212_1$ (for example) contains neighbor cell information $213_{a1}$ (for this example) associated with one or more of the dedicated radio access networks $202_1$, $202_2$, $202_3$, $202_4$ and $202_5$ that will have at least a different order of information and possible different information when compared to the neighbor cell information $213_{a2}$ ... $213_{an}$ (for this example) in the other received first system information messages $212_2$ ... $212_n$ (for this example)(see FIG. 4B's step 402b—plus see aforementioned description about the round-robin scheme 302b). In the reading step 404b, the processor 406 reads one or more data elements $215_1$, $215_2$ ... $215_8$ (e.g., at most three data elements are specifically selected) containing the neighbor cell information $213_{a1}$, $213_{a2}$ ... $213_{an}$ from each received first system information message $212_1$, $212_2$ ... $212_n$ (see FIG. 4B's step 404b). In the monitoring step 406b, the monitoring unit 404 monitors network features 410 within one or more of the dedicated radio access networks $202_1$, $202_2$, $202_3$, $202_4$ and $202_5$, wherein the network features 410 correspond to the portions of neighbor cell information $213_{a1}$, $213_{a2}$ ... $213_{an}$ read from the one or more data elements $215_1$, $215_2$ ... $215_8$ in each received first system information message $212_1$, $212_2$ ... $212_n$ (see FIG. 4B's step 406b). The legacy mobile station $206_1$ will also receive other messages including the aforementioned SI3 message 207, the aforementioned SI22 message(s) 210, and the aforementioned first system information messages $212_1$, $212_2$ ... $212_{15}$. It should be appreciated that the legacy mobile station $206_1$ includes other components which are well known to those skilled in the art but only the components which are needed to explain and enable the present invention are described herein.

Figure 5A:
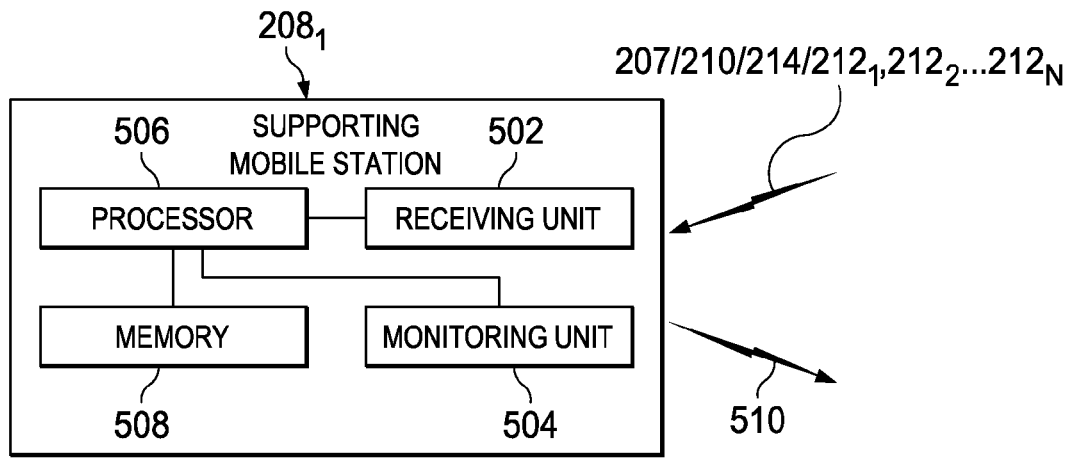
FIGS. 5A-5B respectively show a diagram illustrating the basic components of the supporting mobile station and a flowchart illustrating the basic steps of a method which is implemented by the supporting mobile station in accordance with an embodiment of the present invention.
Figure 5B:
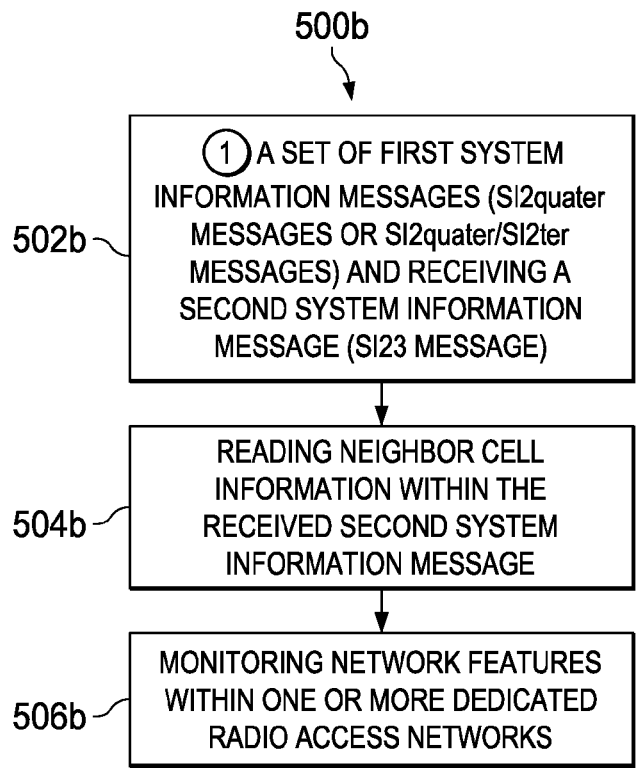

Referring to FIGS. 5A-5B, there are respectively shown a diagram illustrating the basic components of the supporting mobile station $208_1$ (for example) and a flowchart illustrating the basic steps of a method 500b which is implemented by the supporting mobile station $208_1$ in accordance with an embodiment of the present invention. As shown in FIG. 5A, the supporting mobile station $208_1$ comprises at least a receiving unit 502, a monitoring unit 504, a processor 506, and a memory 508 that stores processor-executable instructions where the processor 506 interfaces with the memory 508 and executes the processor-executable instructions to implement the method 500 by enabling a receiving step 502b, a reading step 504b, and a monitoring step 506b. In the receiving step 502b, the receiving unit 502 receives (1) the set of a first system information messages $212_1$, $212_2$ ... $212_n$, wherein each one of the first system information messages $212_1$, $212_2$ ... $212_n$ is differentiated by an order of neighbor cell information $213_{a1}$, $213_{a2}$ ... $213_{an}$, $213_{a1'}$, $213_{a2'}$ ... $213_{an'}$ listed therein when compared to the other first system information messages $212_1$, $212_2$ ... $212_n$ and possibly each one of the first system information messages $212_1$, $212_2$ ... $212_n$ is further differentiated from one another by which neighbor cell information $213_{a1}$, $213_{a2}$ ... $213_{an}$, $213_{a1'}$, $213_{a2'}$ ... $213_{an'}$ is listed therein when compared to the other first system information messages $212_1$, $212_2$ ... $212_n$, and (2) the second system information message 214 (see FIG. 5B's step 502b). In the reading step 504b, the processor 506 reads the neighbor cell information 213b from the received second system information message 214 (see FIG. 5B's step 504b). In the monitoring step 506b, the monitoring unit 504 monitors network features 510 within the one or more dedicated radio access networks $202_1$, $202_2$, $202_3$, $202_4$ and $202_5$, wherein the network features 510 correspond to the neighbor cell information 213b read from the received second system information message 214 (see FIG. 5B's step 506b). The supporting mobile station $208_1$ will also receive other messages including the aforementioned SI3 message 207 and the aforementioned SI22 message(s) 210. It should be appreciated that the supporting mobile station $208_1$ includes other components which are well known to those skilled in the art but only the components which are needed to explain and enable the present invention are described herein.

In view of the foregoing, one skilled in the art will readily appreciate that the BSS 204 and method 300b sequentially broadcasts a set of first system information messages $212_1$, $212_2 \ldots 212_n$ (e.g., SI2quater messages or pairs of SI2ter messages and SI2quater messages) for the legacy mobile stations $206_1$, $206_2$, $206_3$, $206_4$ and $206_5$ which enhances the overall probability (over time) that the legacy mobile stations $206_1$, $206_2$, $206_3$, $206_4$ and $206_5$ in a network sharing scenario will find the relevant frequency, cell information or a combination of both within the broadcasted system information messages $212_1$, $212_2 \ldots 212_n$ to be used for their respective cell reselection process in order to provide continuity with their respective registered PLMNs (i.e. the Common PLMN of the GERAN network 200) as determined by their respective preferred PLMN(s) which may include one or more of PLMNs $202_1$, $202_2$, $202_3$, $202_4$ and $202_5$. In addition, the BSS 204 and method 300b periodically broadcasts the second system information message 214 for the supporting mobile stations $208_1$, $208_2$ and $208_3$ in order to provide them relevant frequency, cell information or a combination of both within the broadcasted system information message 214 to be used for their respective cell reselection process in order to provide continuity with their respective registered PLMNs $202_4$, $202_1$, and $202_5$.

One skilled in the art will also readily appreciate based on the teachings herein that the BSS 204 and method 300b repeatedly broadcasts the set of first system information messages $212_1$, $212_2 \ldots 212_n$ (e.g., SI2quater messages or pairs of SI2ter messages and SI2quater messages) for the legacy mobile stations $206_1$, $206_2$, $206_3$, $206_4$ and $206_5$ to provide the complete set of frequencies/cell monitoring information $213_{a1}$, $213_{a2} \ldots 213_{an}$ in a predetermined manner (round-robin manner) such that any legacy mobile station $206_1$ (for example) will, with equal probability based on a worst case interpretation of their monitoring limitations, find RAT specific neighbor frequencies/cells that provide continuity with the legacy mobile station's registered PLMN (i.e. the Common PLMN of the GERAN network 200) as determined by the legacy mobile station's respective preferred PLMN(s) which may include of one or more of PLMNs $202_1$, $202_2$, $202_3$, $202_4$ and $202_5$. Hence, a basis for this solution is the monitoring capabilities of the legacy mobile stations $206_1$, $206_2$, $206_3$, $206_4$ and $206_5$ and a worst case scenario interpretation of their unspecified behavior (if the number of broadcasted frequencies exceeds their capabilities), i.e. that:

Legacy mobile stations $206_1$, $206_2$, $206_3$, $206_4$ and $206_5$ only monitor three frequencies per RAT and mode and ignore the (possibly) remaining frequencies of the same RAT and mode in the SI2ter/SI2quater messages.

Here it has been assumed that the legacy mobile stations $206_1$, $206_2$, $206_3$, $206_4$ and $206_5$ prioritization of these three frequencies is first decided by their respective priority values and secondly by the order in which they occur in SI2ter/SI2quater messages (for the case where all frequencies, per RAT and mode, have the same priority value). Now, with this said, it can be seen that the BSS 204's scheme to rotate the frequencies broadcast within SI2ter/SI2quater messages $212_1$, $212_2 \ldots 212_n$ is a marked-improvement over the prior art in that the present invention's scheme maximizes the probability, for all legacy mobile stations $206_1$, $206_2$, $206_3$, $206_4$ and $206_5$ that at least one of the first three frequencies read by each legacy mobile station $206_1$, $206_2$, $206_3$, $206_4$ and $206_5$ supports either the same PLMN or an equivalent PLMN of the PLMN with which each legacy mobile station $206_1$, $206_2$, $206_3$, $206_4$ and $206_5$ is registered to (i.e. the Common PLMN of the GERAN network 200) especially for the case where the GERAN cells supports 4 or 5 shared PLMNs. For example, when the GERAN network is shared between 5 PLMNs the frequencies could be provided in a round-robin manner such that over the course of five consecutive rotations of the SI2ter/SI2quater messages $212_1$, $212_2 \ldots 212_n$ the first three neighbor frequencies/cells identified by the corresponding neighbor cell information $213_{a1}$, $213_{a2} \ldots 213_{an}$, $213_{a1'}$, $213_{a2'} \ldots 213_{an'}$ provide at least three instances of PLMN continuity for each of the shared PLMNs (see TABLE #3). It may also be beneficial to broadcast neighbor cell information that provides the maximum number of frequencies (i.e. all of the available eight frequencies) in the interest of those legacy mobile stations $206_1$, $206_2$, $206_3$, $206_4$ and $206_5$ that may use the entire list for their cell re-selection process. To accomplish all of this, the BSS 204 would broadcast different versions of SI2ter/SI2quater messages (first system information messages $212_1$, $212_2 \ldots 212_n$) where the versions are differentiated by the order of frequencies and which frequencies are included therein. The BSS 204 could trigger the legacy mobile stations $206_1$, $206_2$, $206_3$, $206_4$ and $206_5$ to re-read the SI2ter/SI2quater messages by setting SI_CHANGE_FIELD=2 in the S13 Rest Octets IE and toggling the bit for the SI2ter_3G_CHANGE_MARK and 3G_BA_IND parameters in the SI2ter Rest Octets IE and SI2quater Rest Octets IE respectively. For instance, the BSS 204 could broadcast SI2quater messages $212_{a1}$, $212_{a2} \ldots 212_{an}$ where each SI2quater message is configured such that the neighbor cell information contained therein provides at most three frequencies per radio access technology (RAT) and mode (FDD or TDD) associated with one or more of the dedicated radio access networks ($202_1$, $202_2$, $202_3$, $202_4$ and $202_5$) and possibly at most sixty-four frequency and scrambling codes pairs associated with one or more of the dedicated radio access networks ($202_1$, $202_2$, $202_3$, $202_4$ and $202_5$). Further, the BSS 204 could broadcast pairs of SI2quater messages $212_{a1}$, $212_{a2} \ldots 212_{an}$ and SI2ter messages $212_{b1}$, $212_{b2} \ldots 212_{bn}$ where each pair of SI2quater and SI2ter messages is configured such that the neighbor cell information contained therein provides at most three frequencies per radio access technology (RAT) and mode (FDD or TDD) associated with one or more of the dedicated radio access networks ($202_1$, $202_2$, $202_3$, $202_4$ and $202_5$) and possibly at most sixty-four frequency and scrambling codes pairs associated with one or more of the dedicated radio access networks ($202_1$, $202_2$, $202_3$, $202_4$ and $202_5$).

One skilled in the art will also based on the teachings herein realize that an advantage of the present invention is to improve idle mobility for legacy mobile stations $206_1$, $206_2$, $206_3$, $206_4$ and $206_5$ (i.e. non-supporting mobile stations) by allowing them to experience a greater probability of finding neighbor frequencies/cells within SI2ter/SI2quater messages $212_1$, $212_2 \ldots 212_n$ that provide continuity with their registered PLMN (i.e. the Common PLMN of the GERAN network 200) when compared to attempting to orient the content of the SI2ter/SI2quater message to provide neighbor frequencies/cells for both legacy mobile stations $206_1$, $206_2$, $206_3$, $206_4$ and $206_5$ and supporting mobile stations $208_1$, $208_2$ and $208_3$. As discussed above, the BSS 204 is configured to provide neighbor frequencies/cells for supporting mobile stations $208_1$, $208_2$ and $208_3$ (which may not have the same limitations as legacy mobile stations $206_1$, $206_2$, $206_3$, $206_4$ and $206_5$ in that they may read more than the first three frequencies per RAT and mode) by using system information messages other than the SI2ter/SI2quater messages and thereby allow the content of SI2ter/SI2quater messages to be managed with the express intent of addressing the operational

The invention claimed is:

1. A telecommunications node for use in a shared radio access network associated with a plurality of dedicated radio access networks, the telecommunications node comprising:
   a transmitter;
   a processor; and
   a memory that stores processor-executable instructions where the processor interfaces with the memory and executes the processor-executable instructions to enable the following act:
   sequentially broadcast a set of first system information messages, wherein each one of the first system information messages is differentiated by an order of multiple instances of neighbor cell information listed therein when compared to the other first system information messages, and wherein the multiple instances of neighbor cell information are associated with one or more of the dedicated radio access networks; and
   each one of the first system information messages comprises a SI2quater message, wherein the SI2quater message is configured such that the neighbor cell information contained therein provides at most three frequencies per radio access technology (RAT) and mode, and at most sixty-four frequency and scrambling codes pairs associated with one or more of the dedicated radio access networks.

2. The telecommunications node of claim 1, wherein each one of the first system information messages is further differentiated by containing different instances of neighbor cell information therein when compared to the other first system information messages.

3. The telecommunications node of claim 1, wherein the processor interfaces with the memory and executes the processor-executable instructions to further enable the following act:
   periodically broadcast a second system information message which contains multiple instances of neighbor cell information associated with one or more of the dedicated radio access networks.

4. A method in a telecommunications node for managing network sharing in a shared radio access network associated with a plurality of dedicated radio access networks, the method comprising:
   sequentially broadcasting a set of first system information messages, wherein each one of the first system information messages is differentiated by an order of multiple instances of neighbor cell information listed therein when compared to the other first system information messages, and wherein the multiple instances of neighbor cell information are associated with one or more of the dedicated radio access networks; and
   each one of the first system information messages comprises a SI2quater message, wherein the SI2quater message is configured such that the neighbor cell information contained therein provides at most three frequencies per radio access technology (RAT) and mode, and at most sixty-four frequency and scrambling codes pairs associated with one or more of the dedicated radio access networks.

5. The method of claim 4, wherein each one of the first system information messages is further differentiated by containing different instances of neighbor cell information therein when compared to the other first system information messages.

6. The method of claim 4, further comprising:
   periodically broadcasting a second system information message which contains multiple instances of neighbor cell information associated with one or more of the dedicated radio access networks.

7. A mobile station for use in a shared radio access network associated with a plurality of dedicated radio access networks, the mobile station comprising:
   a receiving unit;
   a monitoring unit;
   a processor; and
   a memory that stores processor-executable instructions where the processor interfaces with the memory and executes the processor-executable instructions to enable the following acts:
   receive, by the receiving unit, (1) a set of first system information messages, wherein each one of the received first system information messages is differentiated by an order of multiple instances of neighbor cell information listed therein when compared to the other received first system information messages, wherein the multiple instances of neighbor cell information are associated with one or more of the dedicated radio access networks, wherein each one of the first system information messages comprises a SI2quater message, and wherein the SI2quater message is configured such that the neighbor cell information contained therein provides at most three frequencies per radio access technology (RAT) and mode, and at most sixty-four frequency and scrambling codes pairs associated with one or more of the dedicated radio access networks, and (2) a second system information message containing multiple instances of neighbor cell information associated with one or more of the dedicated radio access networks;
   read, by the processor, the multiple instances of neighbor cell information within the received second system information message; and
   monitor, by the monitoring unit, network features of one or more of the dedicated radio access networks, wherein the network features are associated with the multiple instances of neighbor cell information within the received second system information message.

8. A method in a mobile station for use in a shared radio access network associated with a plurality of dedicated radio access networks, the method comprising:
   receiving a set of first system information messages, wherein each one of the received first system information messages is differentiated by an order of multiple instances of neighbor cell information listed therein when compared to the other received first system information messages, wherein the multiple instances of neighbor cell information are associated with one or more of the dedicated radio access networks, wherein each one of the first system information messages comprises a SI2quater message, and wherein the SI2quater message is configured such that the neighbor cell information contained therein provides at most three frequencies per radio access technology (RAT) and mode, and at most sixty-four frequency and scrambling codes pairs associated with one or more of the dedicated radio access networks, and a second system information message containing multiple instances of neighbor cell information associated with one or more of the dedicated radio access networks;

reading the multiple instances of neighbor cell information within the received second system information message; and monitoring network features of one or more of the dedicated radio access networks, wherein the network features are associated with the multiple instances of neighbor cell information within the received second system information message.

9. The telecommunications node of claim 1, wherein the processor interfaces with the memory and executes the processor-executable instructions to enable the following act:

sequentially re-broadcast the set of first system information messages.

10. The telecommunications node of claim 9, wherein the processor interfaces with the memory and executes the processor-executable instructions to enable the following act:

sequentially broadcast and re-broadcast the set of first system information messages in a round-robin fashion.

11. The method of claim 4, further comprising:

sequentially re-broadcasting the set of first system information messages.

12. The method of claim 11, further comprising:

sequentially broadcasting and re-broadcasting the set of first system information messages in a round-robin fashion.

13. A mobile station for use in a shared radio access network associated with a plurality of dedicated radio access networks, the mobile station comprising:

a receiving unit;

a monitoring unit;

a processor; and a memory that stores processor-executable instructions where the processor interfaces with the memory and executes the processor-executable instructions to enable the following acts:

receive, by the receiving unit, a set of first system information messages, wherein each one of the received first system information messages is differentiated by an order of multiple instances of neighbor cell information listed therein when compared to the other received first system information messages, wherein the multiple instances of neighbor cell information are associated with one or more of the dedicated radio access networks, wherein each one of the first system information messages comprises a SI2quater message, and wherein the SI2quater message is configured such that the neighbor cell information contained therein provides at most three frequencies per radio access technology (RAT) and mode, and at most sixty-four frequency and scrambling codes pairs associated with one or more of the dedicated radio access networks;

read, by the processor, the multiple instances of neighbor cell information within the received set of first system information messages; and monitor, by the monitoring unit, network features of one or more of the dedicated radio access networks, wherein the network features are associated with the multiple instances of neighbor cell information within the received set of first system information messages.

14. A method in a mobile station for use in a shared radio access network associated with a plurality of dedicated radio access networks, the method comprising:

receiving a set of first system information messages, wherein each one of the received first system information messages is differentiated by an order of multiple instances of neighbor cell information listed therein when compared to the other received first system information messages, wherein the multiple instances of neighbor cell information are associated with one or more of the dedicated radio access networks, wherein each one of the first system information messages comprises a SI2quater message, and wherein the SI2quater message is configured such that the neighbor cell information contained therein provides at most three frequencies per radio access technology (RAT) and mode, and at most sixty-four frequency and scrambling codes pairs associated with one or more of the dedicated radio access networks;

reading the multiple instances of neighbor cell information within the received set of first system information messages; and monitoring network features of one or more of the dedicated radio access networks, wherein the network features are associated with the multiple instances of neighbor cell information within the received set of first system information messages.

15. A telecommunications node for use in a shared radio access network associated with a plurality of dedicated radio access networks, the telecommunications node comprising:

a transmitter;

a processor; and a memory that stores processor-executable instructions where the processor interfaces with the memory and executes the processor-executable instructions to enable the following acts:

sequentially broadcast and re-broadcast a set of first system information messages for one type of mobile station, wherein each one of the first system information messages is differentiated by an order of multiple instances of neighbor cell information listed therein when compared to the other first system information messages, and wherein the multiple instances of neighbor cell information are associated with one or more of the dedicated radio access networks, and wherein each one of the first system information messages comprises a SI2quater message or a pair of SI2quater and SI2ter messages, and wherein the SI2quater message is configured such that the neighbor cell information contained therein provides at most three frequencies per radio access technology (RAT) and mode, and at most sixty-four frequency and scrambling codes pairs associated with one or more of the dedicated radio access networks;

periodically broadcast a second system information message for a second type of mobile station, wherein the second system information message contains multiple instances of neighbor cell information associated with one or more of the dedicated radio access networks;

broadcast a message which indicates that the telecommunications network supports network sharing; and broadcast another message which contains network sharing information.

16. The telecommunications node of claim 15, wherein each one of the first system information messages is further differentiated by containing different instances of neighbor cell information therein when compared to the other first system information messages.

17. A method in a telecommunications node for use in a shared radio access network associated with a plurality of dedicated radio access networks, the method comprising:
   sequentially broadcasting and re-broadcasting, by the telecommunications node, a set of first system information messages for one type of mobile station, wherein each one of the first system information messages is differentiated by an order of multiple instances of neighbor cell information listed therein when compared to the other first system information messages, and wherein the multiple instances of neighbor cell information are associated with one or more of the dedicated radio access networks, and wherein each one of the first system information messages comprises a SI2quater message or a pair of SI2quater and SI2quater messages, and wherein the SI2quater message is configured such that the neighbor cell information contained therein provides at most three frequencies per radio access technology (RAT) and mode, and at most sixty-four frequency and scrambling codes pairs associated with one or more of the dedicated radio access networks;
   periodically broadcasting, by the telecommunications node, a second system information message for a second type of mobile station, wherein the second system information message contains multiple instances of neighbor cell information associated with one or more of the dedicated radio access networks;
   broadcasting, by the telecommunications node, a message which indicates that the telecommunications network supports network sharing; and
   broadcasting, by the telecommunications node, another message which contains network sharing information.

18. The method of claim 17, wherein each one of the first system information messages is further differentiated by containing different instances of neighbor cell information therein when compared to the other first system information messages.

19. The mobile station of claim 13, wherein each one of the first system information messages is further differentiated by containing different instances of neighbor cell information therein when compared to the other first system information messages.

20. The method of claim 14, wherein each one of the first system information messages is further differentiated by containing different instances of neighbor cell information therein when compared to the other first system information messages.

* * * * *